United States Patent
Trinh et al.

(10) Patent No.: US 9,528,442 B2
(45) Date of Patent: Dec. 27, 2016

(54) AIRCRAFT ENGINE ANTI-ICING (EAI) BARRIER ASSEMBLY, SYSTEM AND METHOD

(71) Applicant: The Boeing Company, Chicago, IL (US)

(72) Inventors: Haisan K. Trinh, Santa Ana, CA (US); Stuart W. Vogel, Long Beach, CA (US); Robert T. Breister, Long Beach, CA (US); Jack W. Mauldin, Seattle, WA (US)

(73) Assignee: The Boeing Company, Chicago, IL (US)

( * ) Notice: Subject to any disclaimer, the term of this patent is extended or adjusted under 35 U.S.C. 154(b) by 604 days.

(21) Appl. No.: 13/972,902

(22) Filed: Aug. 21, 2013

(65) Prior Publication Data
US 2015/0176490 A1    Jun. 25, 2015

(51) Int. Cl.
*F02C 7/047*    (2006.01)
*B64D 15/02*    (2006.01)
*B64D 33/02*    (2006.01)

(52) U.S. Cl.
CPC ............... *F02C 7/047* (2013.01); *B64D 15/02* (2013.01); *B64D 2033/0233* (2013.01);
(Continued)

(58) Field of Classification Search
CPC .. B64D 15/04; B64D 2033/0233; F02C 7/047; F01D 25/02; F05B 2260/208; F16L 5/025; F16L 5/14; F16L 39/005; F16L 39/04; F16L 41/086; F16L 41/088; F16L 41/10; F16L 41/12; F16L 41/14
(Continued)

(56) References Cited

U.S. PATENT DOCUMENTS 2,563,054 A * 8/1951 Messinger ............. B64D 15/02
126/110 E
3,187,778 A * 6/1965 Peyton .................. F16L 59/024
138/143
(Continued)

FOREIGN PATENT DOCUMENTS

FR    2961174 A1    12/2011
GB    2259679 A    3/1993

OTHER PUBLICATIONS

FR 2961174, English machine translation.*
(Continued)

*Primary Examiner* — Tien Dinh
*Assistant Examiner* — Alexander V Giczy

(57) ABSTRACT

An aircraft engine anti-icing barrier assembly having a slip joint subassembly, a barrier subassembly, and a vapor barrier subassembly. The slip joint subassembly has a forward end for fixed attachment at a forward bulkhead of an aircraft engine, and has an aft end having a sliding joint. The barrier subassembly is attached to an aft side of an aft bulkhead and inserted through the aft bulkhead. The barrier subassembly has two mount pads with an upper mount pad and a lower mount pad configured for joined sealed attachment around the slip joint subassembly to form a barrier between an engine fan case compartment and an aft compartment in an engine inlet. The vapor barrier subassembly is attached to the aft side of the aft bulkhead and adjacent the barrier subassembly, has a boot element and a boot element retainer, and forms a vapor barrier to the slip joint subassembly.

20 Claims, 23 Drawing Sheets

(52) U.S. Cl.
CPC ......... *F05D 2230/60* (2013.01); *Y02T 50/671* (2013.01); *Y10T 29/49229* (2015.01)

(58) Field of Classification Search
USPC .................................................. 138/112–114
See application file for complete search history.

(56) References Cited

U.S. PATENT DOCUMENTS

| | | | | |
|---|---|---|---|---|
| 3,558,391 | A | * | 1/1971 | Peyton et al. ........ B29C 70/088 |
| | | | | 138/103 |
| 4,250,927 | A | * | 2/1981 | Newburg .................. F16L 7/00 |
| | | | | 138/113 |
| 4,691,741 | A | * | 9/1987 | Affa ........................ F16L 59/07 |
| | | | | 138/113 |
| 4,757,963 | A | * | 7/1988 | Cole ...................... B64D 15/04 |
| | | | | 244/134 B |
| 4,874,648 | A | * | 10/1989 | Hill ..................... B29C 44/5636 |
| | | | | 138/110 |
| 5,088,277 | A | | 2/1992 | Schulze |
| 5,400,984 | A | | 3/1995 | Arnold et al. |
| 6,003,814 | A | * | 12/1999 | Pike ....................... B64D 15/04 |
| | | | | 239/587.1 |
| 6,193,192 | B1 | * | 2/2001 | Porte ...................... F02C 7/047 |
| | | | | 244/134 B |
| 6,267,328 | B1 | * | 7/2001 | Vest ....................... B64D 15/04 |
| | | | | 239/599 |
| 7,975,966 | B2 | | 7/2011 | De Souza et al. |
| 2007/0235100 | A1 | * | 10/2007 | Tomerlin ................ F16L 11/118 |
| | | | | 138/112 |
| 2008/0149771 | A1 | | 6/2008 | Zanarelli et al. |
| 2010/0037974 | A1 | * | 2/2010 | Fernandes ................. F16L 9/18 |
| | | | | 138/141 |
| 2010/0200699 | A1 | | 8/2010 | Porte |
| 2011/0011981 | A1 | * | 1/2011 | Vauchel ................. B64D 33/02 |
| | | | | 244/134 B |

OTHER PUBLICATIONS

European Patent Office Extended European Search Report for Counterpart Patent Application No. EP14172649.7-1607, Applicant The Boeing Company, dated Feb. 11, 2015, 7 pages.

\* cited by examiner

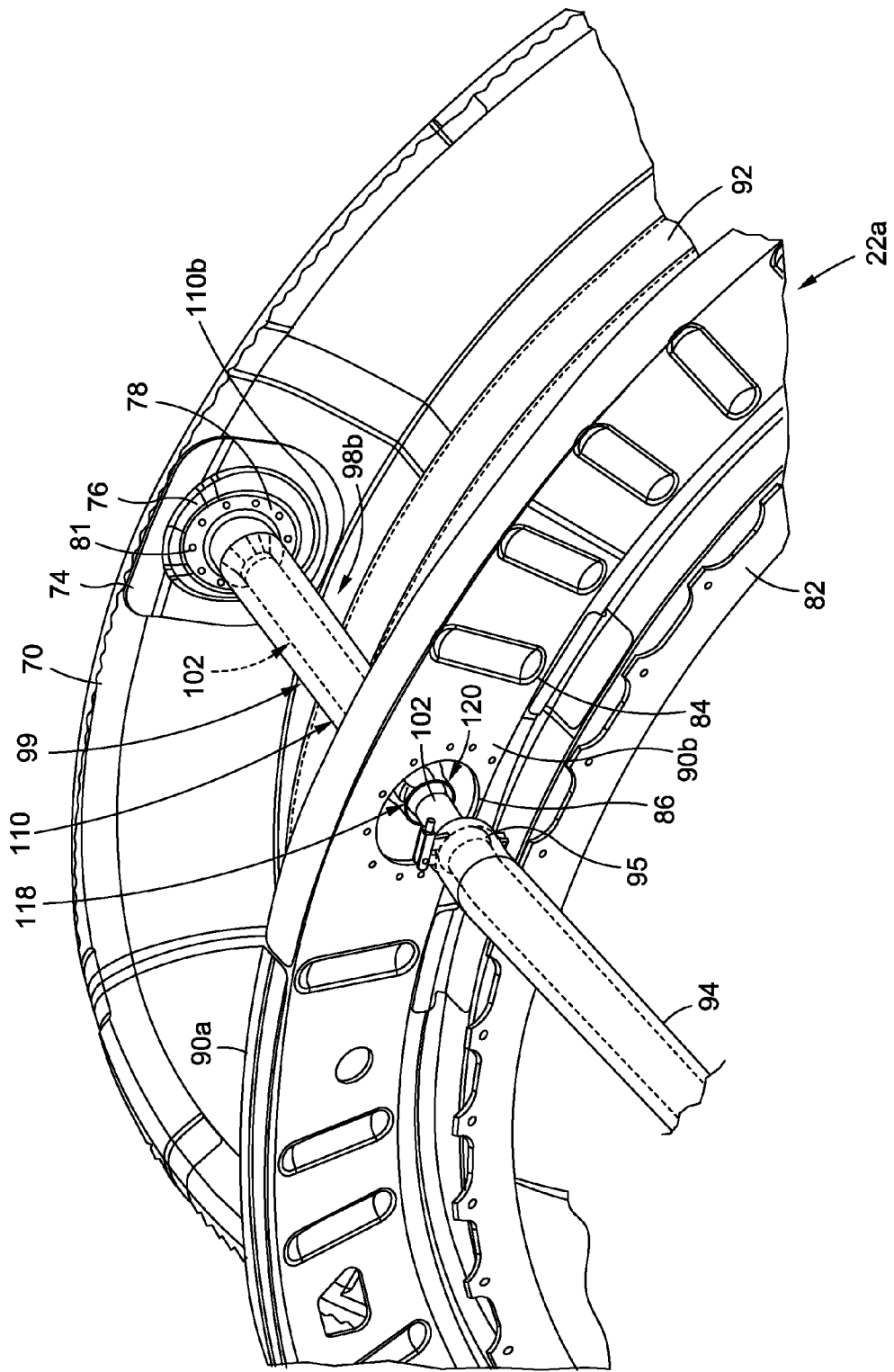

AIRCRAFT ENGINE ANTI-ICING (EAI) BARRIER ASSEMBLY, SYSTEM AND METHOD

BACKGROUND

1) Field of the Disclosure

The disclosure relates generally to anti-icing assemblies, systems and methods, and more specifically, to aircraft engine anti-icing (EAI) barrier assemblies, systems and methods for air vehicles such as aircraft.

2) Description of Related Art

Air vehicles, such as commercial passenger aircraft, cargo aircraft, and other types of aircraft, typically employ anti-icing assemblies or systems to prevent accumulation of ice on leading edges of aircraft structures. For example, if ice accumulates on an engine inlet of an aircraft gas turbine engine, such as on a leading edge or lip of the engine inlet, such ice accumulation may disturb airflow and affect aerodynamic performance. Moreover, ice pieces may break off and enter the engine, resulting in possible damage to the engine.

Known aircraft engine anti-icing (EAI) assemblies, systems and methods exist. Such known EAI devices, systems and methods may involve transporting hot air or hot gases from the engine's compressor, e.g., engine compressor bleed air, to the engine inlet to provide thermal anti-icing to the engine inlet to prevent ice accumulation. In addition, such known aircraft EAI devices, systems and methods may involve the use and installation of a complex assembly of structures, for example, link structures to support the supply ducts and/or seals to prevent leakage of the supply ducts.

However, the use and installation of such known link structures to support the supply ducts may involve increased labor, time, and complexity to assemble and install. This may, in turn, result in increased manufacturing costs. In addition, such link structures may require the use of numerous installation and assembly attachments, such as fasteners, brackets or other attachment elements, which may add weight to the aircraft. Such increased weight may, in turn, impose a performance penalty with respect to the aircraft, i.e., increased aircraft fuel consumption.

Moreover, known seals used to prevent leakage of the supply ducts may include the use of silicone based seals, silicone/metallic seals, and elastomeric seals, as well as carbon seals. However, such known silicone based seals, silicone/metallic seals, and elastomeric seals may not be able to tolerate the very high temperatures, i.e., about 800 degrees Fahrenheit, or greater, that may be required for the supply duct, the engine inlet, and surrounding parts. In addition, such known silicone based seals, silicone/metallic seals, and elastomeric seals may have limited wear resistance, may require time consuming maintenance and inspection procedures to be performed after installation and use, and may be difficult to install if only blind installation, i.e., by feel alone, is available. Further, known carbon seals may be expensive, which, in turn, may result in increased manufacturing costs.

Accordingly, there is a need in the art for improved aircraft engine anti-icing (EAI) barrier assemblies, systems and methods for air vehicles such as aircraft.

SUMMARY

This need for improved aircraft engine anti-icing (EAI) barrier assemblies, systems and methods for gas turbine engines of air vehicles such as aircraft is satisfied by this disclosure. As discussed in the below detailed description, embodiments of the improved aircraft engine anti-icing (EAI) barrier assemblies, systems and methods for air vehicles such as aircraft may provide significant advantages over known assemblies, methods and systems.

In one embodiment of the disclosure, there is provided an aircraft engine anti-icing (EAI) barrier assembly. The aircraft EAI barrier assembly comprises a slip joint subassembly having a forward end and an aft end. The forward end is configured for fixed attachment at a forward bulkhead of an engine of an aircraft, and the aft end has a sliding joint. The aircraft EAI barrier assembly further comprises a barrier subassembly attached through an aft bulkhead. The barrier subassembly comprises two mount pads configured for joined sealed attachment around the aft end of the slip joint subassembly to form a barrier to an engine inlet of the engine.

In another embodiment of the disclosure, there is provided an aircraft engine anti-icing (EAI) barrier system. The aircraft EAI barrier system comprises an aircraft engine anti-icing (EAI) assembly. The aircraft EAI barrier assembly comprises a slip joint subassembly. The slip joint subassembly comprises an inner supply duct slidably engaged within an outer shroud duct. The inner supply duct and the outer shroud duct each have a forward end configured for fixed attachment at a forward bulkhead of an engine of an aircraft. The inner supply duct and the outer shroud duct each have an aft end at an aft bulkhead of the engine. The aft ends form a sliding joint via one or more support elements disposed between the aft ends. The aircraft EAI barrier assembly further comprises a barrier subassembly attached through the aft bulkhead. The barrier subassembly comprises two mount pads configured for joined sealed attachment around the aft end of the outer shroud duct to form a barrier to an engine inlet of the engine. The aircraft EAI barrier system further comprises a forward insulating component wrapped around the outer shroud duct. The aircraft EAI barrier system further comprises an aft insulating component wrapped around the aft end of the inner supply duct. The aircraft EAI barrier system further comprises a clamp element attached to the aft insulating component.

In another embodiment of the disclosure, there is provided a method of installing an aircraft engine anti-icing (EAI) barrier assembly in an engine of an aircraft. The method comprises the step of installing a slip joint subassembly between a forward bulkhead opening and an aft bulkhead opening in an engine of an aircraft. The slip joint subassembly comprises a forward end and an aft end. The aft end has a sliding joint. The method further comprises the step of fixing the forward end of the slip joint subassembly to a nozzle assembly attached through the forward bulkhead opening. The method further comprises the step of installing and attaching a barrier subassembly through the aft bulkhead opening to form an aft bulkhead interface on an aft side of the aft bulkhead. The method further comprises the step of attaching two mount pads of the barrier subassembly in a joined sealed attachment around the aft end of the slip joint subassembly to form a barrier to an engine inlet of the engine.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 5B is an illustration of a close-up, top perspective view of the slip joint subassembly of FIG. 5A in a second installation position between the aft bulkhead and the forward bulkhead of the engine of the aircraft;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Figure 1:
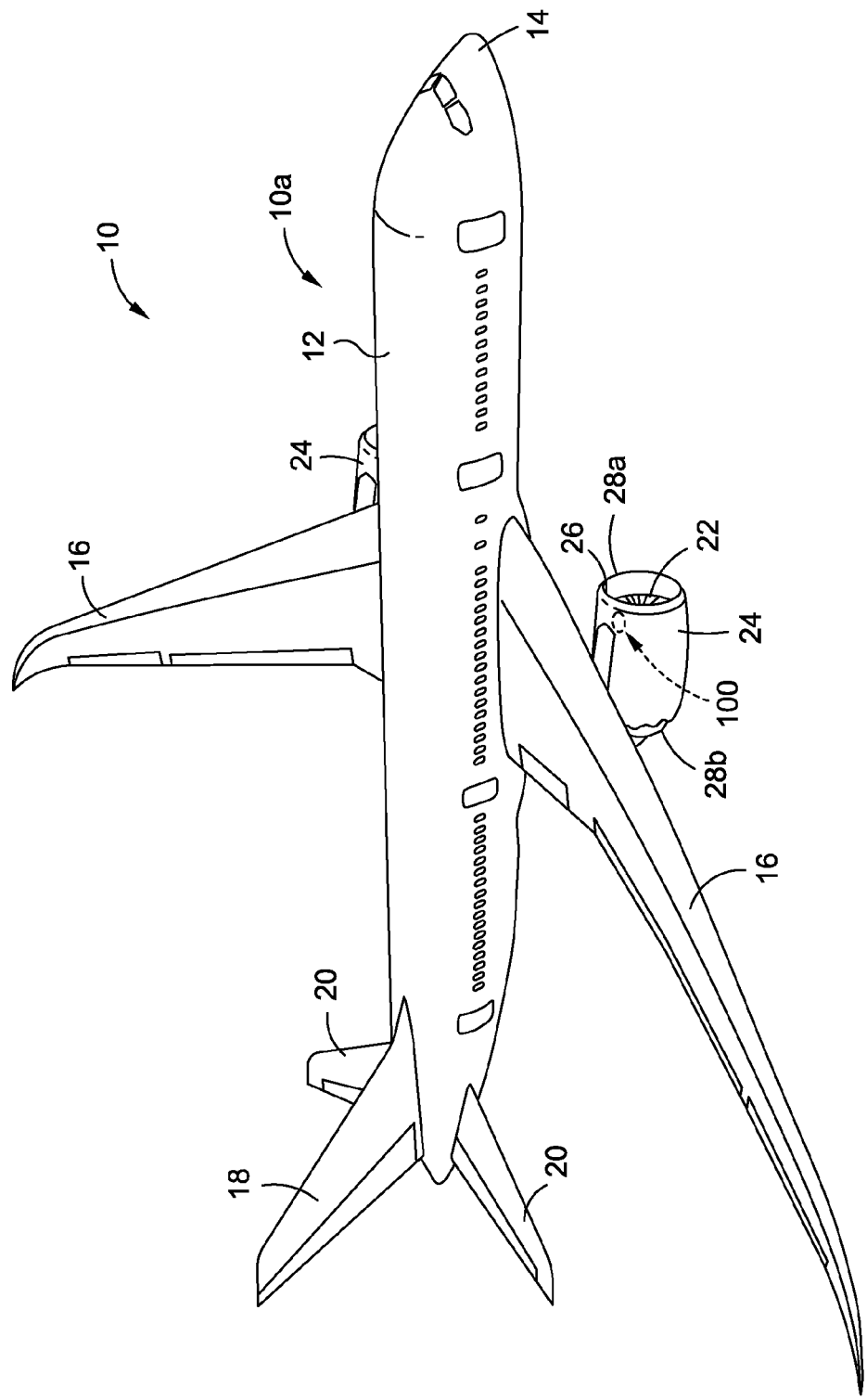
FIG. 1 is a perspective view of an air vehicle that may incorporate an embodiment of an aircraft engine anti-icing (EAI) barrier system of the disclosure.

Now referring to the Figures, FIG. 1 is a perspective view of an air vehicle 10, such as in the form of an aircraft 10a, that may incorporate an aircraft engine anti-icing (EAI) barrier system 100 (see also FIGS. 8A-8B) of the disclosure. The aircraft EAI barrier system 100 (see FIGS. 1, 8A-8B) comprises an aircraft engine anti-icing (EAI) barrier assembly 101 (see FIGS. 6A-6D) of the disclosure. Further, a method 300 (see FIG. 11) of installing the aircraft EAI barrier assembly 101 in the aircraft 10a is disclosed.

As shown in FIG. 1, the air vehicle 10, such as in the form of aircraft 10a, comprises a fuselage 12, a nose 14, wings 16, a vertical stabilizer tail portion 18, horizontal tail portions 20, and nacelles 24. As further shown in FIG. 1, each nacelle 24 houses an engine 22 and has an engine inlet 26. As further shown in FIG. 1, the nacelle 22 has a forward end 28a and an aft end 28b. The aircraft EAI barrier system 100 (see FIGS. 8A-8B) and the aircraft EAI barrier assembly 101 (see FIGS. 6A-6D) may preferably be used in engine 22 (see FIG. 1), such as gas turbine engines, of air vehicles 10 (see FIG. 1), such as aircraft 10a (see FIG. 1). The engine 22 (see FIG. 1) may also be referred to herein in pertinent partial form as engine 22a (see FIGS. 5A, 10A).

Although the air vehicle 10 shown in FIG. 1 is generally representative of a commercial passenger aircraft having the aircraft EAI barrier system 100 (see also FIGS. 8A-8B), the teachings of the disclosed embodiments may be applied to other passenger aircraft, cargo aircraft, military aircraft, rotorcraft, and other types of aircraft or aerial vehicles, as well as well as boats and other watercraft, trains, automobiles, trucks, buses, or other suitable structures that may use an engine anti-icing system, assembly and method of the disclosure.

Figure 2A:
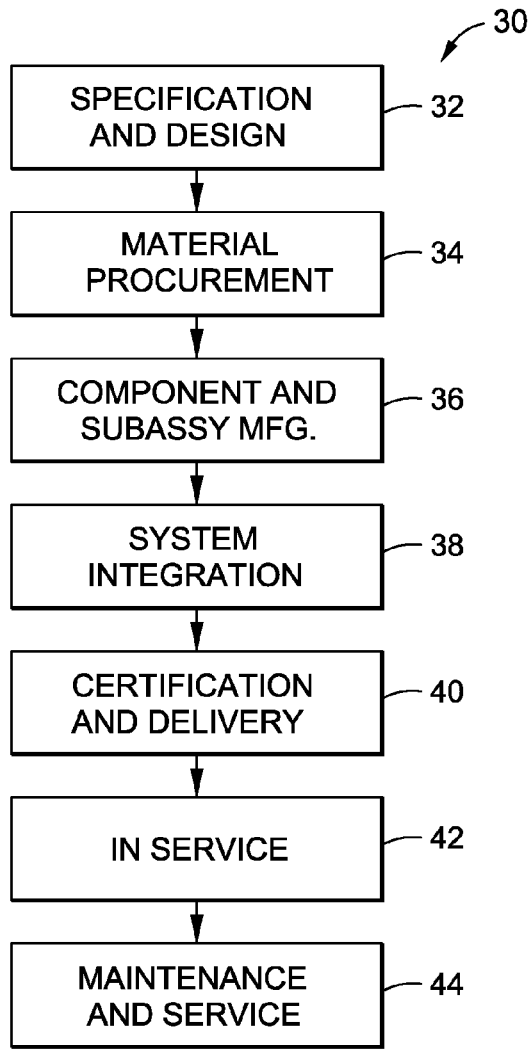
FIG. 2A is a flow diagram of an aircraft manufacturing and service method.
Figure 2B:
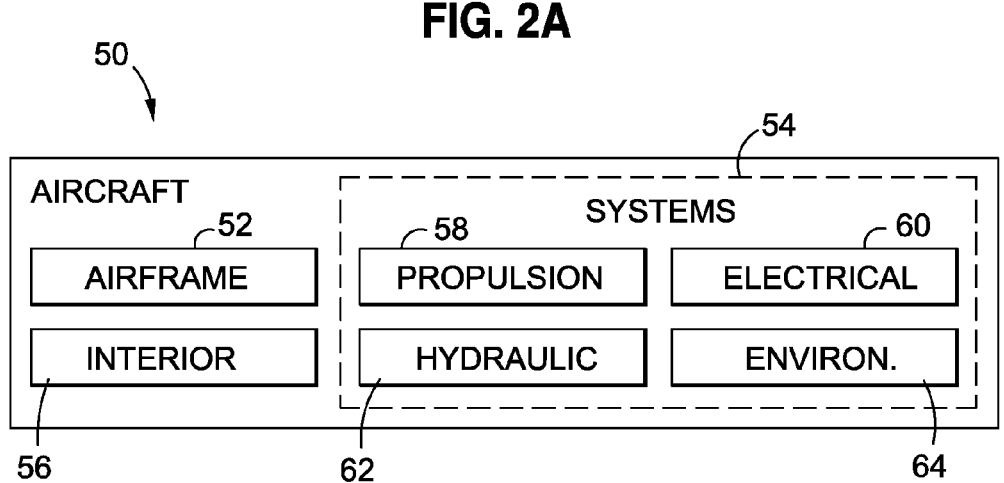
FIG. 2B is a block diagram of an aircraft.

FIG. 2A is an illustration of a flow diagram of an aircraft manufacturing and service method 30. FIG. 2B is an illustration of a block diagram of an aircraft 50. Referring to FIGS. 2-3, embodiments of the disclosure may be described in the context of the aircraft manufacturing and service method 30 as shown in FIG. 2A and the aircraft 50 as shown in FIG. 2B. During pre-production, the aircraft manufacturing and service method 30 may include specification and design 32 of the aircraft 50 and material procurement 34. During the aircraft manufacturing and service method 30, component and subassembly manufacturing 36 and system integration 38 of the aircraft 50 takes place. Thereafter, the aircraft 50 may go through certification and delivery 40 in order to be placed in service 42. While in service 42, the aircraft 50 may be scheduled for routine maintenance and service 44 (which may also include modification, reconfiguration, refurbishment, and other suitable services).

Each of the processes of the aircraft manufacturing and service method 30 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and other suitable operators.

As shown in FIG. 2B, the aircraft 50 produced by the aircraft manufacturing and service method 30 may include an airframe 52 with a plurality of systems 54 and an interior 56. Examples of high-level systems 54 may include one or more of a propulsion system 58, an electrical system 60, a hydraulic system 62, and an environmental system 64. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 30. For example, components or subassemblies corresponding to component and subassembly manufacturing 36 may be fabricated or manufactured in a manner similar to components or subassemblies produced while the aircraft 50 is in service. Also, one or more apparatus embodiments, method embodiments, or a combination thereof, may be utilized during component and subassembly manufacturing 36 and system integration 38, for example, by substantially expediting assembly of or reducing the cost of the aircraft 50. Similarly, one or more of assembly embodiments, system embodiments, method embodiments, or a combination thereof, may be utilized while the aircraft 50 is in service, for example and without limitation, to maintenance and service 44.

In one embodiment of the disclosure, there is provided an aircraft engine anti-icing (EAI) barrier assembly 101 (see FIGS. 6A-6D). The aircraft EAI barrier assembly 101 (see FIGS. 6A-6D) comprises a slip joint subassembly 99 (see FIGS. 3A-3C).

Figure 3A:
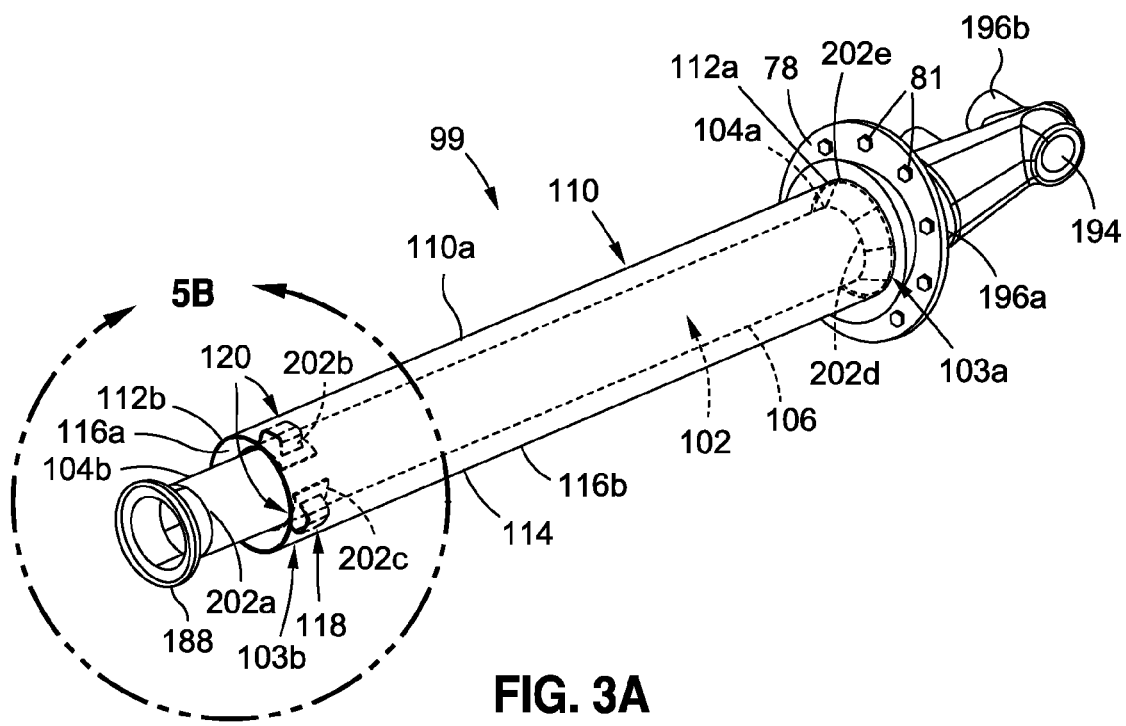
FIG. 3A is an illustration of a side perspective view of a slip joint subassembly with one embodiment of a support element and an outer shroud duct that may be used in an aircraft EAI barrier assembly and in an aircraft EAI barrier system of the disclosure.
Figure 3B:
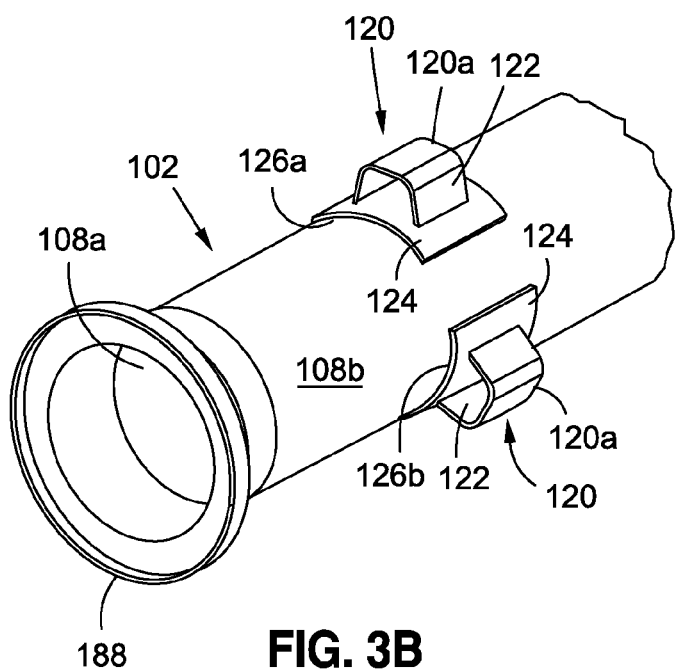
FIG. 3B is an illustration of a close-up, partial perspective view of the dotted circle 3B of FIG. 3A, without the outer shroud duct, and showing the embodiment of the support element attached to an inner supply duct.
Figure 3C:
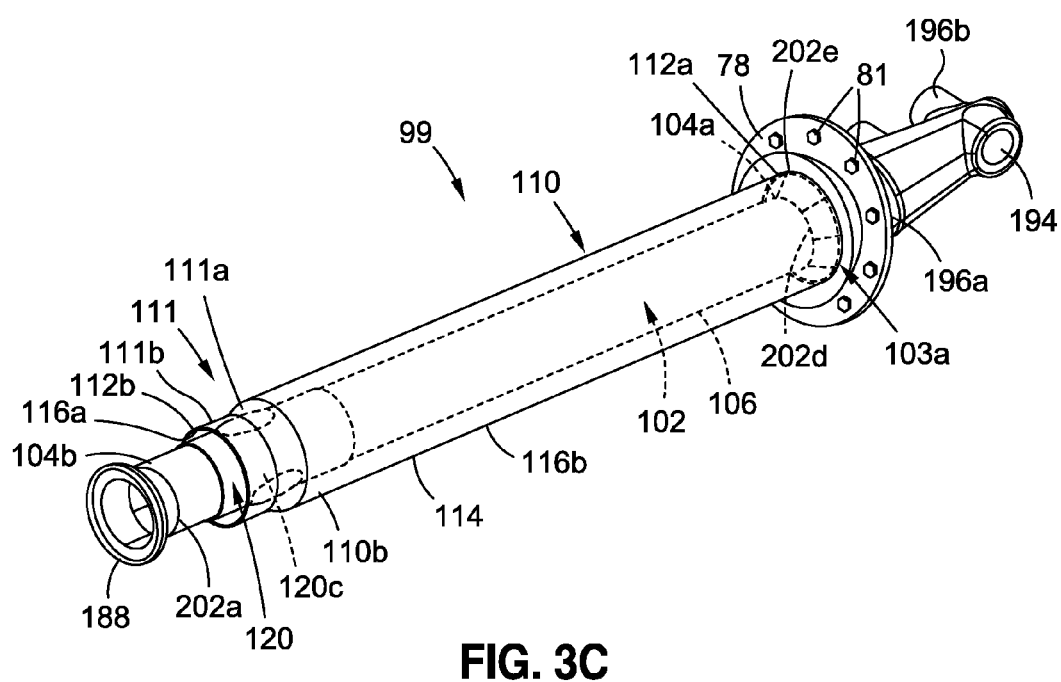
FIG. 3C is an illustration of a side perspective view of a slip joint subassembly with another embodiment of a support element and an outer shroud duct that may be used in an aircraft EAI barrier assembly and in an aircraft EAI barrier system of the disclosure.

FIG. 3A is an illustration of a side perspective view of the slip joint subassembly 99 with one embodiment of a support element 120 and an outer shroud duct 110 that may be used in the aircraft EAI barrier assembly 101 (see FIGS. 6A-6D) and in the aircraft EAI barrier system 100 (see FIGS. 8A-8B) of the disclosure. FIG. 3B is an illustration of a close-up, partial perspective view of the dotted circle 3B of FIG. 3A, without the outer shroud duct 110, and showing the embodiment of the support element 120 attached to an inner supply duct 102. FIG. 3C is an illustration of a side perspective view of a slip joint subassembly with another embodiment of a support element 120 and an outer shroud duct 110 that may be used in the aircraft EAI barrier assembly 101 (see FIGS. 6A-6D) and in the aircraft EAI barrier system 100 (see FIGS. 8A-8B) of the disclosure.

As shown in FIG. 3A, the slip joint subassembly 99 has a forward end 103a and an aft end 103b. The forward end 103a (see FIG. 3A) of the slip joint subassembly 99 is preferably configured for fixed attachment at a forward bulkhead 70 (see FIG. 5B) of an engine 22a (see FIG. 5B) of an aircraft 10a (see FIG. 1). The aft end 103b (see FIG. 3A) of the slip joint subassembly 99 (see FIG. 3A) preferably has a sliding joint 118 (see FIG. 3A). When the slip joint subassembly 99 (see FIG. 5B) is installed between the aft bulkhead 82 (see FIG. 5B) and the forward bulkhead 70 (see FIG. 5B), the sliding joint 118 (see FIG. 5B) is located at the aft bulkhead 82 (see FIG. 5B) or in close proximity to the aft bulkhead 82 (see FIG. 5B) of the engine 22a (see FIG. 5B) of the aircraft 10a (see FIG. 1).

As further shown in FIG. 3A, the slip joint subassembly 99 preferably comprises an inner supply duct 102 slidably engaged within and engaged to an outer shroud duct 110 in a slip joint configuration. As used herein, "slip joint configuration" means a mechanical construction or configuration, such as a telescopic or sliding construction or configuration, between two linear components, where the two linear components are fixed at one end and are slip joined at the other end to allow for expansion and contraction of the linear components in a lengthwise direction.

The inner supply duct 102 (see FIG. 3A) has a forward end 104a (see FIG. 3A), an aft end 104b (see FIG. 3A), and a cylindrical body 106 (see FIG. 3A) formed there between. The inner supply duct 102 (see FIG. 3B) further has an inner surface 108a (see FIG. 3B) and an outer surface 108b (see FIG. 3B). The inner supply duct 102 may have an outer diameter of 1.5 inches or more in size, 2.0 inches or more in size, or another suitable size. The inner supply duct 102 is preferably made of a metal material such as a nickel alloy, steel, a steel alloy, or another suitable metal material. Preferably, the inner supply duct 102 is made of a metal material capable of withstanding very high temperature applications, such as preferably about 800 degrees Fahrenheit or greater; more preferably, about 1100 degrees Fahrenheit or greater; and most preferably, in a range of from about 800 degrees Fahrenheit to about 1300 degrees Fahrenheit.

As further shown in FIG. 3A, the outer shroud duct 110 has a forward end 112a, an aft end 112b, and a cylindrical body 114 formed there between. The outer shroud duct 110 (see FIG. 3A) may be in the form of an outer shroud duct 110a (see FIG. 3A) having a linear configuration. The outer shroud duct 110 (see FIG. 3A) further has an inner surface 116a (see FIG. 3A) and an outer surface 116b (see FIG. 3A). The outer shroud duct 110 may have an outer diameter of 2.75 inches or more in size, 3.0 inches or more in size, or another suitable size. The outer shroud duct 110 is preferably made of a metal material such as a nickel alloy, steel, a steel alloy, or another suitable metal material. Preferably, the outer shroud duct 110 is made of a metal material capable of withstanding very high temperature applications, such as preferably about 800 degrees Fahrenheit or greater; more preferably, about 1100 degrees Fahrenheit or greater; and most preferably, in a range of from about 800 degrees Fahrenheit to about 1300 degrees Fahrenheit.

As further shown in FIG. 3A, the forward end 104a of the inner supply duct 102 is preferably attached directly to a nozzle assembly 194. Preferably, the inner supply duct 102 is attached to the nozzle assembly 194 in an airtight manner, such as via welding or another attachment means or process, that forms an airtight seal. As shown if FIG. 3A, the inner supply duct 102 may be welded to the nozzle assembly 194 via a weld 202d formed at the attachment of the inner supply duct 102 to the nozzle assembly 194. As further shown in FIG. 3A, the forward end 112a of the outer shroud duct 110 is preferably welded directly to the nozzle assembly 194 via a weld 202e formed at the attachment of the outer shroud duct 110 to the nozzle assembly 194.

The nozzle assembly 194 is preferably attached, such as via welding, to the inner supply duct 102 and the outer shroud duct 110 at or near a first end 196a (see FIG. 3A) of the nozzle assembly 194 (see FIG. 3A). A second end 196b (see FIG. 3A) of the nozzle assembly 194 (see FIG. 3A) may be attached to additional fittings (not shown) or attachments (not shown) on the forward side 80a (see FIG. 5A) of the forward bulkhead 70 (see FIG. 5A). The nozzle assembly 194 (see FIG. 3A) may preferably be in the form of a swirl nozzle assembly or another suitable nozzle assembly.

The nozzle assembly 194 is preferably made of a metal material such as a nickel alloy, steel, a steel alloy, or another suitable metal material. Preferably, the nozzle assembly 194 is made of a metal material capable of withstanding very high temperature applications, such as preferably about 800 degrees Fahrenheit or greater; more preferably, about 1100 degrees Fahrenheit or greater; and most preferably, in a range of from about 800 degrees Fahrenheit to about 1300 degrees Fahrenheit.

Because the inner supply duct 102 (see FIGS. 3A, 5B) and the outer shroud duct 110 (see FIGS. 3A, 5B) are preferably welded to the nozzle assembly 194 (see FIG. 3A) at the forward bulkhead 70 (see FIG. 5B), the need to use leak prevention sealing elements at the forward bulkhead 70 (see FIG. 5B) is preferably eliminated. Such leak prevention sealing elements may be made of materials such as silicone based materials, silicone/metallic materials, or elastomeric materials. Such materials are typically unable to withstand elevated temperatures of greater than about 800 degrees Fahrenheit.

Thus, by having the forward end 103a (see FIG. 3A) of the slip joint subassembly 99 (see FIG. 3A), such as comprising the forward end 104a (see FIG. 3A) of the inner supply duct 102 (see FIG. 3A) and the forward end 112a (see FIG. 3A) of the outer shroud duct 110 (see FIG. 3A), fixed, such as via welding, at the forward bulkhead 70 (see FIG. 5B), the aircraft EAI barrier system 100 (see FIGS. 6A-6D, 8A-8B) and the aircraft EAI barrier assembly 101 (see FIG. 6A) may be used for very high or elevated temperature applications. For example, preferably, the aircraft EAI barrier system 100 (see FIGS. 6A-6D, 8A-8B) and the aircraft EAI barrier assembly 101 (see FIGS. 6A-6D) are able to withstand elevated temperatures of greater than about 800 degrees Fahrenheit. More preferably, the aircraft EAI barrier system 100 (see FIGS. 6A-6D, 8A-8B) and the aircraft EAI barrier assembly 101 (see FIG. 6A) are able to withstand elevated temperatures of greater than about 1100 degrees Fahrenheit. Most preferably, the aircraft EAI barrier system 100 (see FIGS. 6A-6D, 8A-8B) and the aircraft EAI barrier assembly 101 (see FIGS. 6A-6D) are able to withstand elevated temperatures in a range of from about 800 degrees Fahrenheit to about 1300 degrees Fahrenheit.

The leak prevention sealing elements may also comprise carbon seals made of various carbon materials. However, such carbon seals may be very expensive to use, and therefore not cost effective. Thus, because the inner supply duct 102 (see FIG. 3A) and the outer shroud duct 110 (see FIG. 3A) are preferably welded to the nozzle assembly 194 (see FIG. 3A) at the forward bulkhead 70 (see FIG. 5B), the need to use such carbon seals is preferably eliminated.

The inner supply duct 102 (see FIG. 3A) has an aft end 104b (see FIG. 3A), and the outer shroud duct 110 (see FIG. 3A) has an aft end 112b (see FIG. 3A). The aft ends 104b, 112b (see FIG. 3A) preferably form a sliding joint 118 (see FIG. 3A). The sliding joint 118 (see FIG. 3A) is preferably configured to accommodate for thermal expansion of the inner supply duct 102 (see FIG. 3A) in a direction aft of the aft end 112b (see FIG. 3A) of the outer shroud duct 110 (see FIG. 3A). The aft ends 104b, 112b (see FIG. 3A), respectively, form the sliding joint 118 (see FIG. 3A) via one or more support elements 120 (see FIG. 3A) disposed in between the aft ends 104b, 112b (see FIG. 3A).

As further shown in FIG. 3A, the one or more support elements 120 are preferably configured for sliding engagement with an inner surface 116a of the outer shroud duct 110. The one or more support elements 120 (see FIG. 3A) preferably transmit load from the inner supply duct 102 (see FIG. 3A) to the outer shroud duct 110 (see FIG. 3A). The one or more support elements 120 (see FIG. 3A) are preferably configured so that the outer shroud duct 110 (see FIG. 3A) will be able to sufficiently slide over the one or more support elements 120 (see FIG. 3A).

As further shown in FIG. 3A, the inner supply duct 102 may be attached, such as via welding, at the aft end 104b to a coupling element 188. As further shown in FIG. 3A, the coupling element 188 is preferably welded to the inner supply duct 102 via a weld 202a formed at the attachment of the coupling element 188 to the inner supply duct 102.

FIG. 3B shows the dotted circle 3B of FIG. 3A, and the aircraft EAI barrier assembly 101 (see FIGS. 6A-6D) is shown without the outer shroud duct 110. FIG. 3B further shows one of the embodiments of the support element 120, such as in the form of a bumper support element 120a, attached to the inner supply duct 102. As shown in FIG. 3B, one or more support elements 120, such as in the form of one or more bumper support elements 120a, may be attached to the outer surface 108b of the inner supply duct 102.

As further shown in FIG. 3B, each support element 120, such as in the form of bumper support element 120a, may comprise a two-piece configuration comprising a bumper portion 122 and a doubler portion 124. The bumper portion 122 is preferably seam welded to the doubler portion 124. As further shown in FIG. 3B, the doubler portion 124 is preferably attached directly via seam welding to the outer surface 108b of the inner supply duct 102. The bumper portion 122 and the doubler portion 124 are preferably each made of a metal material such as nickel alloy, steel, steel alloy, or another suitable metal material.

As shown in FIG. 3B, one support element 120 is attached at a first portion 126a on the outer surface 108b of the inner supply duct 102, and another support element 120 is attached at a second portion 126b on the outer surface 108b of the inner supply duct 102. The first portion 126a (see FIG. 3B) and the second portion 126b (see FIG. 3B) are preferably spaced apart from each other in an aligned configuration. However, the support elements 120 (see FIG. 3B) may be spaced in other suitable configurations or arrangements along the outer surface 108b (see FIG. 3B) of the inner supply duct 102 (see FIG. 3B).

As further shown in FIG. 3B, the support elements 120 may be welded to the inner supply duct 102. For example, the bumper portion 122 (see FIG. 3B) of the support element 120 (see FIGS. 3A-3B) is preferably welded to the inner supply duct 102 (see FIGS. 3A-3B) via a weld 202b (see FIG. 3A) formed at the attachment of the bumper portion 122 (see FIG. 3B) to the inner supply duct 102 (see FIGS. 3A-3B). In addition, the doubler portion 124 (see FIG. 3B) of the support element 120 (see FIGS. 3A-3B) is preferably welded to the outer surface 108b (see FIG. 3B) of the inner supply duct 102 (see FIGS. 3A-3B) via a weld 202c (see FIG. 3A) formed at the attachment of the doubler portion 124 (see FIG. 3B) to the outer surface 108b (see FIG. 3B) of the inner supply duct 102 (see FIG. 3B).

Figure 4A:
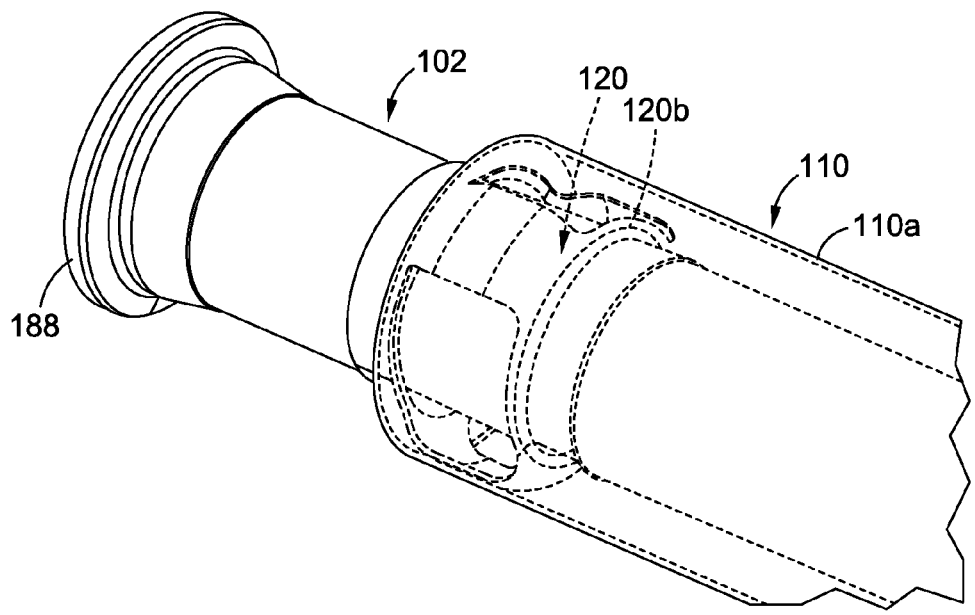
FIG. 4A is an illustration of a close-up, partial perspective view of another embodiment of a support element attached to an inner supply duct.
Figure 4B:
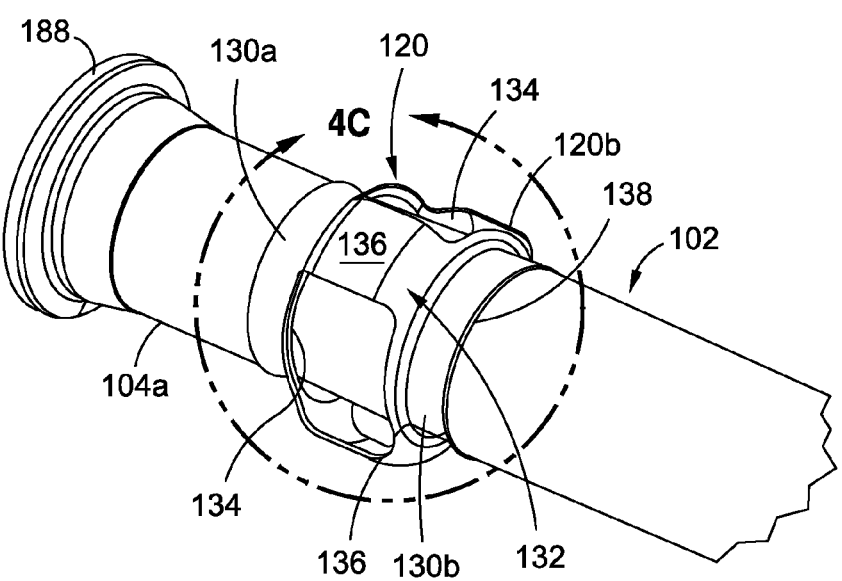
FIG. 4B is an illustration of a close-up, partial perspective view of the support element of FIG. 4A attached to the inner supply duct.
Figure 4C:
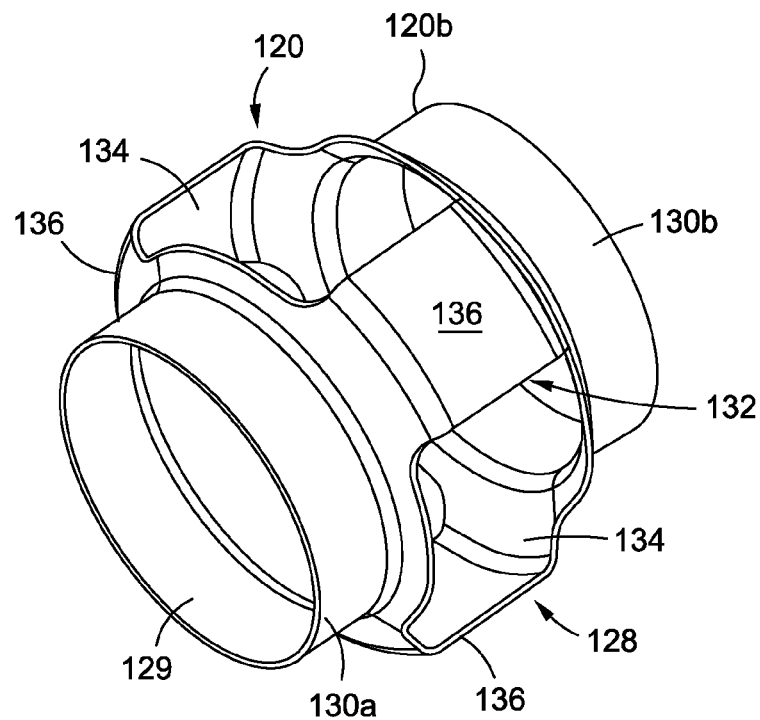
FIG. 4C is an illustration of a close-up perspective view of the dotted circle 4C of FIG. 4B showing the support element of FIG. 4B.
Figure 4D:
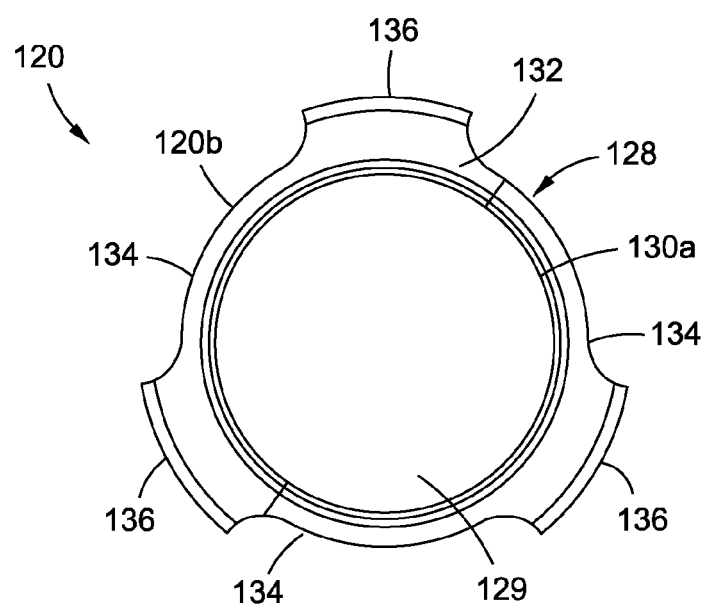
FIG. 4D is an illustration of a close-up front view of the support element of FIG. 4C.
Figure 4E:
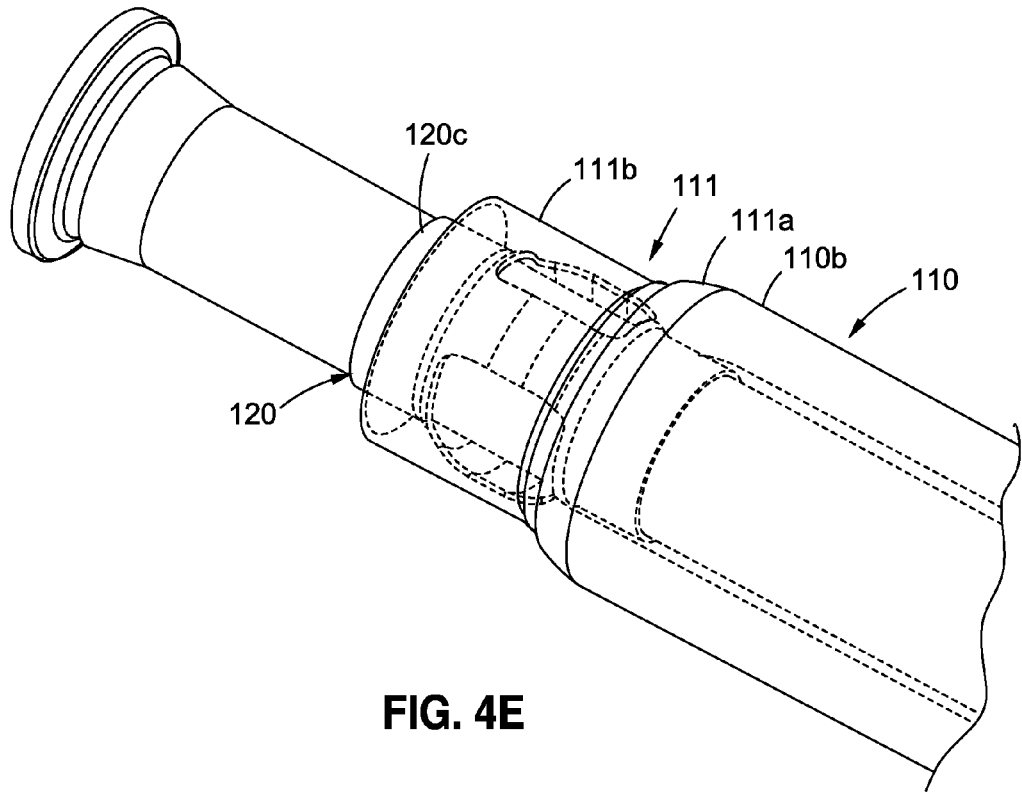
FIG. 4E is an illustration of a close-up, partial perspective view of yet another embodiment of a support element attached to an inner supply duct.
Figure 4F:
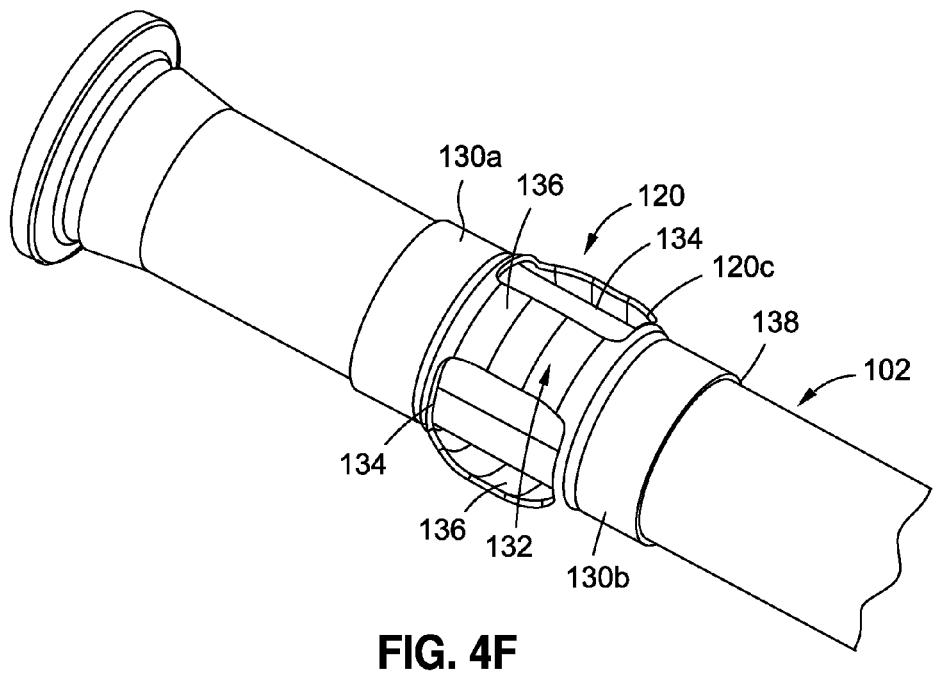
FIG. 4F is an illustration of a close-up, partial perspective view of the support element of FIG. 4E attached to the inner supply duct.

FIG. 3C shows the slip joint subassembly 99 with another embodiment of the support element 120, such as in the form of an elongated ring bumper support element 120c (see also FIG. 4F). FIG. 3C further shows the outer shroud duct 110, such as in the form of outer shroud duct 110b, that may be used in the aircraft EAI barrier assembly 101 (see FIGS. 6A-6D) and in the aircraft EAI barrier system 100 (see FIGS. 6A-6D, 8A-8B) of the disclosure.

FIG. 4A is an illustration of a close-up, partial perspective view of another embodiment of the support element 120, such as in the form of a ring bumper support element 120b, attached to the inner supply duct 102. The ring bumper support element 120b is preferably a one-piece configuration made of a metal material such as nickel alloy, steel, steel alloy, or another suitable metal material.

FIG. 4B is an illustration of a close-up, partial perspective view of the support element 120, such as in the form of the ring bumper support element 120b, of FIG. 4A attached to the inner supply duct 102. As shown in FIG. 4B, the ring bumper support element 120b is preferably a one-piece configuration comprising end portions 130a, 130b and a body portion 132 disposed between the end portions 130a, 130b. As further shown in FIG. 4B, the body portion 132 comprises one or more cut-out portions 134 and one or more raised bumper portions 136 formed between the cut-out portions 134. As further shown in FIG. 4B, the ring bumper support element 120b is attached to the inner supply duct 102 at portion 138 on the aft end 104b of the inner supply duct 102. However, the ring bumper support element 120b (see FIG. 4B) may be attached at other portions of the aft end 104b (see FIG. 4B) of the inner supply duct 102 (see FIG. 4B).

FIG. 4C is an illustration of a close-up perspective view of the dotted circle 4C of FIG. 4B showing the support element 120, such as in the form of the ring bumper support element 120b, of FIG. 4B. FIG. 4D is an illustration of a close-up front view of the support element 120, such as in the form of ring bumper support element 120b, of FIG. 4C. As shown in FIGS. 4C-4D, the support element 120, such as in the form of the ring bumper support element 120b, preferably comprises a substantially ring configuration 128 having a central through opening 129.

As further shown in FIGS. 4C-4D, the support element 120, such as in the form of the ring bumper support element 120b, is shown with three cut-out portions 134 in between three raised bumper portions 136. As further shown in FIGS. 4C-4D, the three cut-out portions 134 may be substantially the same dimensions, and the three raised bumper portions 136 may be substantially the same dimensions. However, the support element 120, such as in the form of the ring bumper support element 120b, may have more than three or less than three cut-out portions 134 of varying dimensions, and may have more than three or less than three raised bumper portions 136 of varying dimensions.

FIG. 4E is an illustration of a close-up, partial perspective view of yet another embodiment of the support element 120, such as in the form of the elongated ring bumper support element 120c (see also FIG. 3C). FIG. 4E further shows the outer shroud duct 110, such as in the form of outer shroud duct 110b, that may be used in the aircraft EAI barrier assembly 101 (see FIGS. 6A-6D) and in the aircraft EAI barrier system 100 (see FIGS. 6A-6D, 8A-8B) of the disclosure. As shown in FIG. 4E, the support element 120, such as in the form of the elongated ring bumper support element 120c, comprises a stepped portion 111. The stepped portion 111 comprises a first portion 111a that may be stepped downwardly in a forward to aft direction. The stepped portion 11 further comprises a second portion 111b that extends in a forward to aft direction from the first portion 111a and is integral with the first portion 111a.

FIG. 4F is an illustration of a close-up, partial perspective view of the support element 120, such as in the form of the elongated ring bumper support element 120c, of FIG. 4E attached to the inner supply duct 102. As shown in FIG. 4F, the support element 120, such as in the form of the elongated ring bumper support element 120c, comprises a first end portion 130a and a second end portion 130b, and further comprises cut-out portions 134 in between raised bumper portions 136. As further shown in FIG. 4F, the cut-out portions 134 may be substantially the same dimensions, and the three bumper portions 136 may be substantially the same dimensions. However, the support element 120, such as in the form of the elongated ring bumper support element 120c, may have more than three or less than three cut-out portions 134 of varying dimensions, and may have more than three or less than three raised bumper portions 136 of varying dimensions. As further shown in FIG. 4F, the support element 120, such as in the form of the elongated ring bumper support element 120c, may be attached to at portion 138 of the supply duct 102.

Figure 5A:
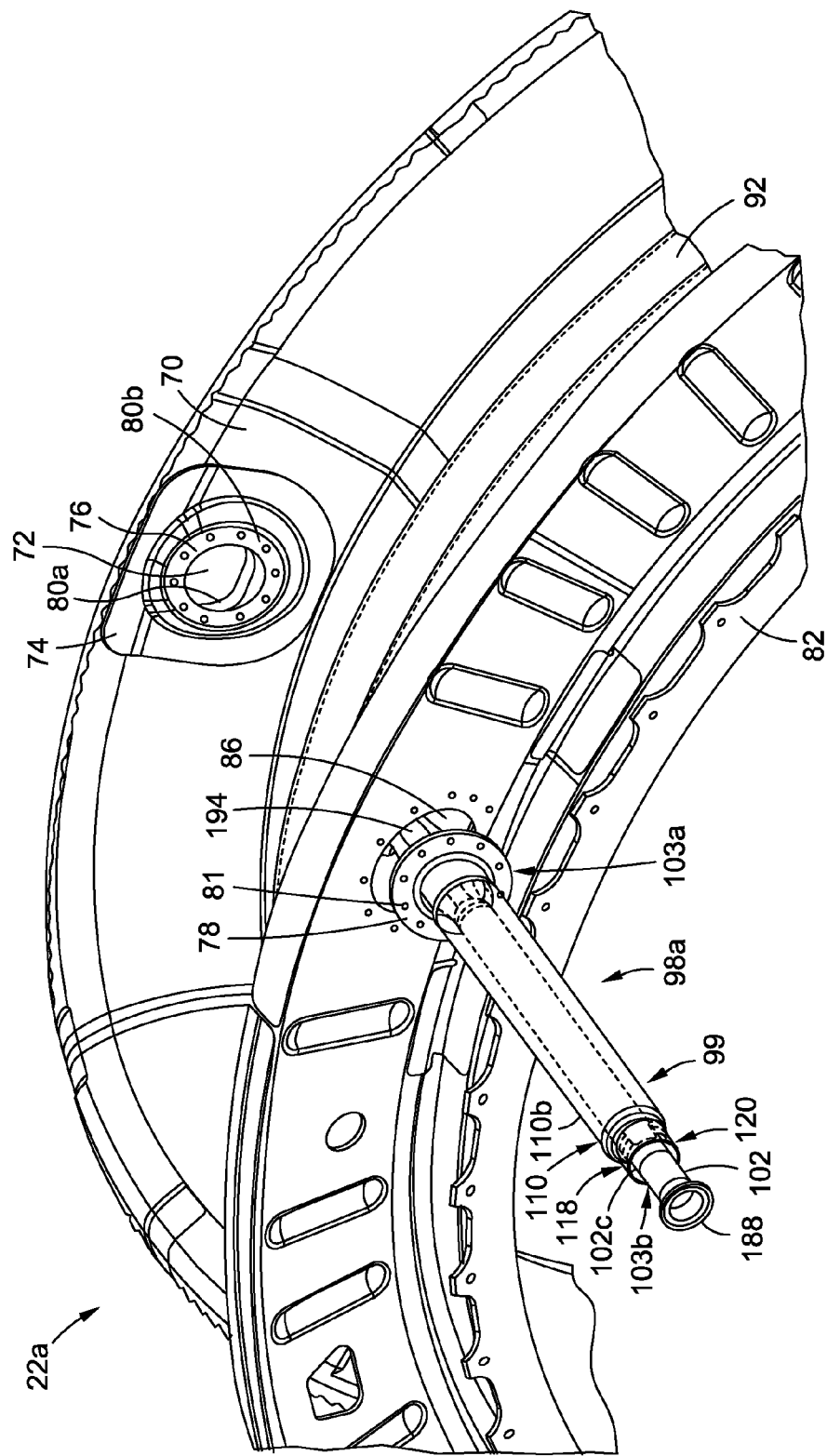
FIG. 5A is an illustration of a close-up, top perspective view of a slip joint subassembly in a first position at an aft bulkhead opening of an engine of an aircraft.

FIG. 5A is an illustration of a close-up, top perspective view of the slip joint subassembly 99 in a first position 98a at an aft bulkhead opening 86 of an engine 22a of an aircraft 10a (see FIG. 1). As shown in FIG. 5A, in the first position 98a, the forward end 103a of the slip joint subassembly 99 is attached to the nozzle assembly 194 and is attached to the nozzle flange 78. As further shown in FIG. 5A, the nozzle flange 78 is preferably disposed between the forward end 103a of the slip joint subassembly 99 and the nozzle assembly 194. As further shown in FIG. 5A, the nozzle assembly 194, the nozzle flange 78, and the slip joint subassembly 99 are preferably inserted through the aft bulkhead opening 86. The aft bulkhead opening 86 (see FIGS. 5A-5B) is formed in an aft bulkhead web 84 (see FIG. 5B) of the aft bulkhead 82 (see FIGS. 5A-5B). The nozzle flange 78 (see FIG. 5A) may be attached to the forward bulkhead interface 76 (see FIG. 5A) via one or more attachment elements 81 (see FIG. 5A), such as in the form of bolts or other suitable attachment elements.

As further shown in FIG. 5A, the forward bulkhead opening 72 is formed in a forward mount pad portion 74 of the forward bulkhead 70. The forward bulkhead interface 76 (see FIG. 5A) is formed on or attached to the forward mount pad portion 74 (see FIG. 5A) on the aft side 80b (see FIG. 5A) of the forward bulkhead 70 (see FIG. 5A). A forward side 80a (see FIG. 5A) of the forward bulkhead 70 (see FIG. 5A) is also shown.

FIG. 5B is an illustration of a close-up, top perspective view of the slip joint subassembly 99 of FIG. 5A in a second installation position 98b between the aft bulkhead 82 and the forward bulkhead 70 of the engine 22a of an aircraft 10a (see FIG. 1). As shown in FIG. 5B, in the second installation position 98b, the nozzle assembly 194 (see FIG. 5A), the nozzle flange 78, and the slip joint subassembly 99 are preferably attached to the forward bulkhead 70 at the forward bulkhead interface 76 formed in the forward mount pad portion 74. The nozzle assembly 194 (see FIG. 5A) is preferably inserted through the forward bulkhead opening 72 (see FIG. 5A) of the forward bulkhead 70 (see FIG. 5A).

The slip joint subassembly 99, as shown in FIG. 5B, preferably extends across the inner barrel portion 92 of the engine 22a between the forward bulkhead opening 72 (see FIG. 5A) formed in the forward bulkhead 70, and the aft bulkhead opening 86 formed in the aft bulkhead web 84 of the aft bulkhead 82. As further shown in FIG. 5B, the inner supply duct 102 and outer shroud duct 110 of the slip joint subassembly 99 are preferably inserted through the aft bulkhead opening 86 so that the outer shroud duct 110 is positioned on a forward side 90a of the aft bulkhead 82, and so that the inner supply duct 102 may span between the forward side 90a of the aft bulkhead 82 and the aft side 80b (see FIG. 5A) of the forward bulkhead 70. As further shown in FIG. 5B, a duct extension 94 may be attached to the inner supply duct 102 at an aft duct extension interface 95 on the aft side 90b of the aft bulkhead 82.

The slip joint subassembly 99 (see FIGS. 3A-3C, 6A, 6C) is a component of the aircraft engine anti-icing (EAI) barrier assembly 101 (see FIGS. 6A-6D), and the aircraft EAI barrier assembly 101 (see FIGS. 6A-6D) is a part of the aircraft engine anti-icing (EAI) barrier system 100 (see FIGS. 6A-6D, FIGS. 8A-8B).

Figure 6A:
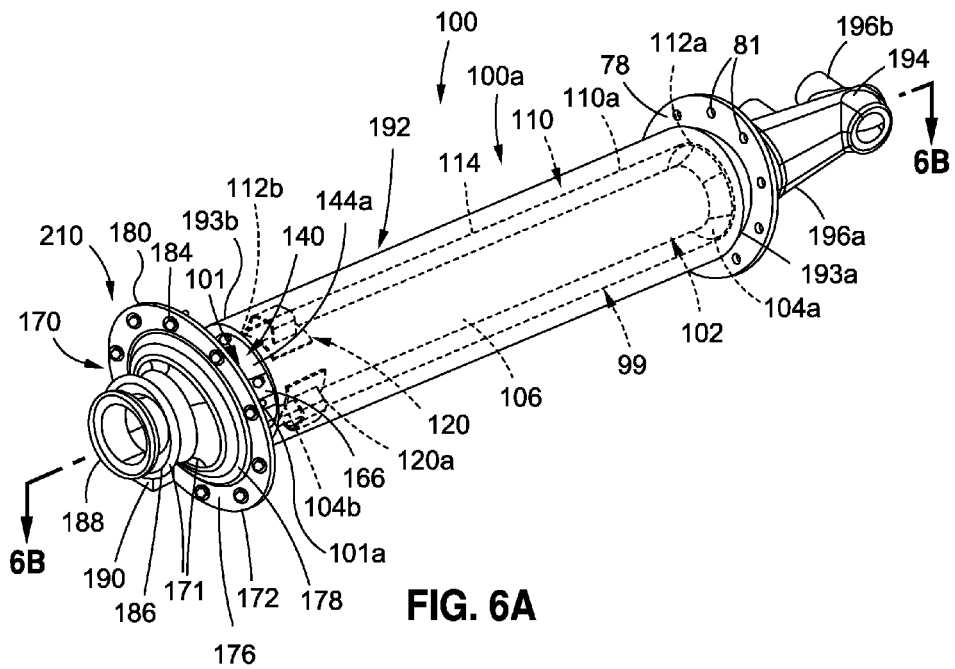
FIG. 6A is an illustration of a side perspective view of an aircraft EAI barrier system of the disclosure with one embodiment of an aircraft EAI barrier assembly.
Figure 6B:
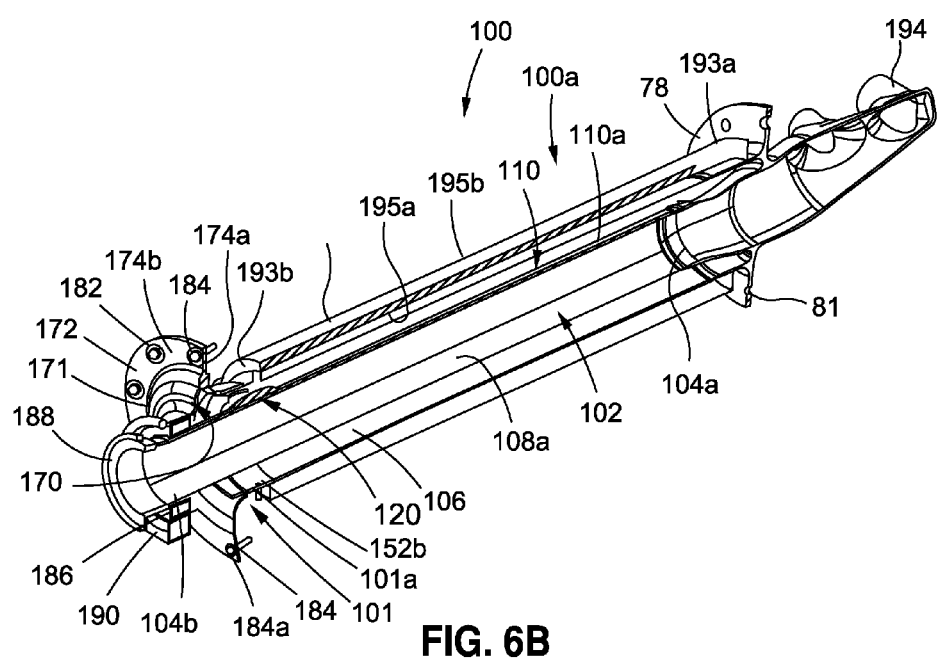
FIG. 6B is an illustration of a cross-sectional view taken along lines 6B-6B of FIG. 6A.

FIG. 6A is an illustration of a side perspective view of one embodiment of the aircraft EAI barrier system 100, such as in the form of aircraft EAI barrier system 100a, with one embodiment of the aircraft EAI barrier assembly 101, such as in the form of aircraft EAI barrier assembly 101a (see FIGS. 6A-6B). FIG. 6B is an illustration of a cross-sectional view taken along lines 6B-6B of FIG. 6A.

Figure 6C:
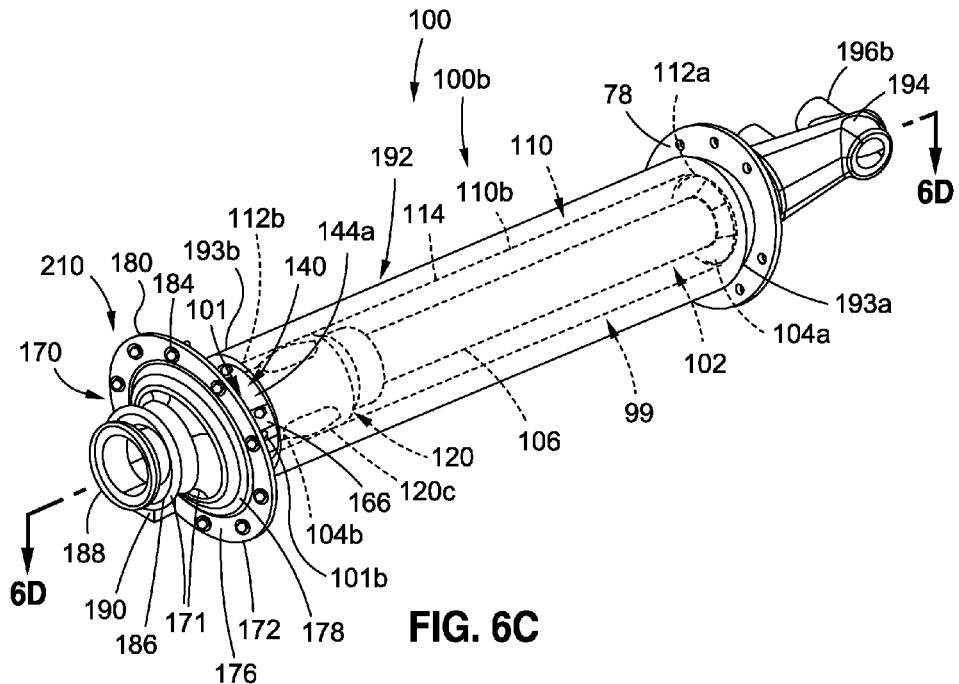
FIG. 6C is an illustration of a side perspective view of another aircraft EAI barrier system of the disclosure with another embodiment of an aircraft EAI barrier assembly.
Figure 6D:
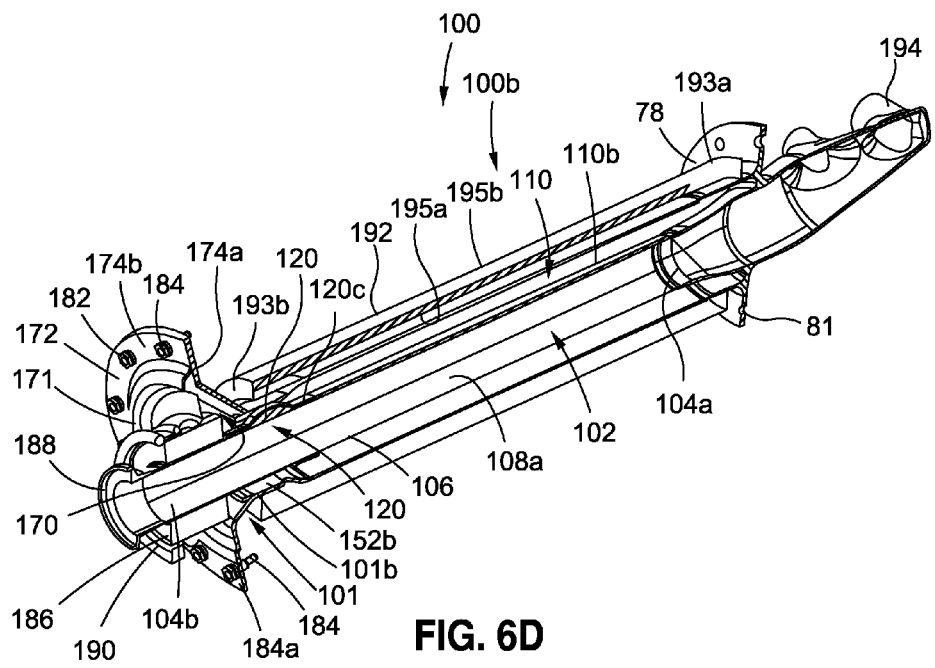
FIG. 6D is an illustration of a cross-sectional view taken along lines 6D-6D of FIG. 6C.

FIG. 6C is an illustration of a side perspective view of another embodiment of the aircraft EAI barrier system 100, such as in the form of aircraft EAI barrier system 100b, with another embodiment of the aircraft EAI barrier assembly 101, such as in the form of aircraft EAI barrier assembly 101b. FIG. 6D is an illustration of a cross-sectional view taken along lines 6D-6D of FIG. 6C.

As shown in FIGS. 6A, 6C, the aircraft EAI barrier assembly 101 comprises the slip joint subassembly 99. As discussed above, the slip joint subassembly 99 (see FIGS. 3A, 3C) has a forward end 103a (see FIGS. 3A, 3C) and an aft end 103b (see FIGS. 3A, 3C). The forward end 103a (see FIGS. 3A, 3C) is configured for fixed attachment at a forward bulkhead 70 (see FIGS. 5A-5B) of an engine 22a (see FIGS. 5A-5B) of an aircraft 10a (see FIG. 1), and the aft end 103b (see FIGS. 3A, 3C) has a sliding joint 118 (see FIGS. 3A, 3C, 8A-8B).

Figure 7A:
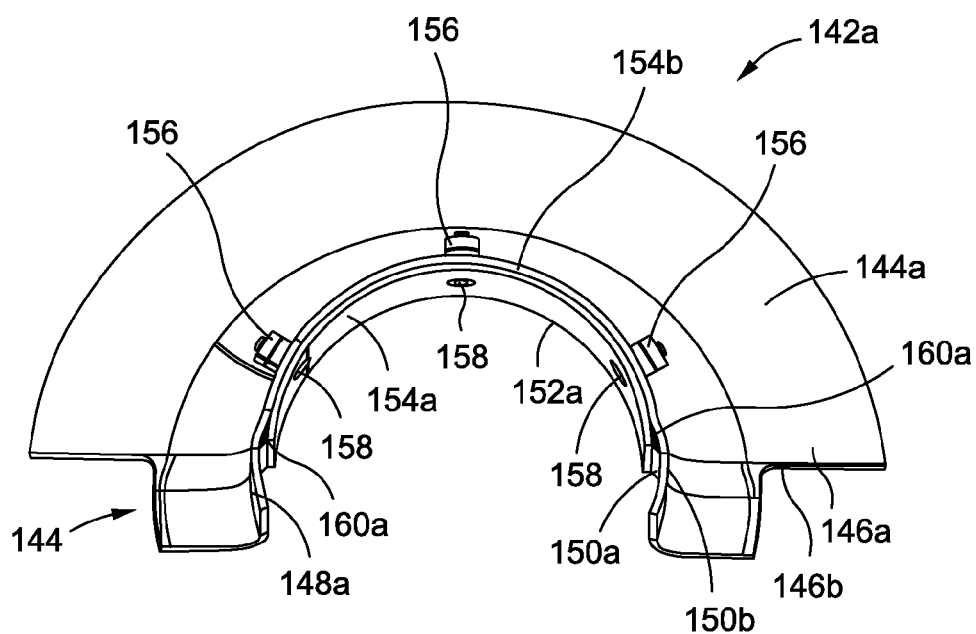
FIG. 7A is an illustration of a front perspective view of one embodiment of an upper mount pad subassembly.
Figure 7B:
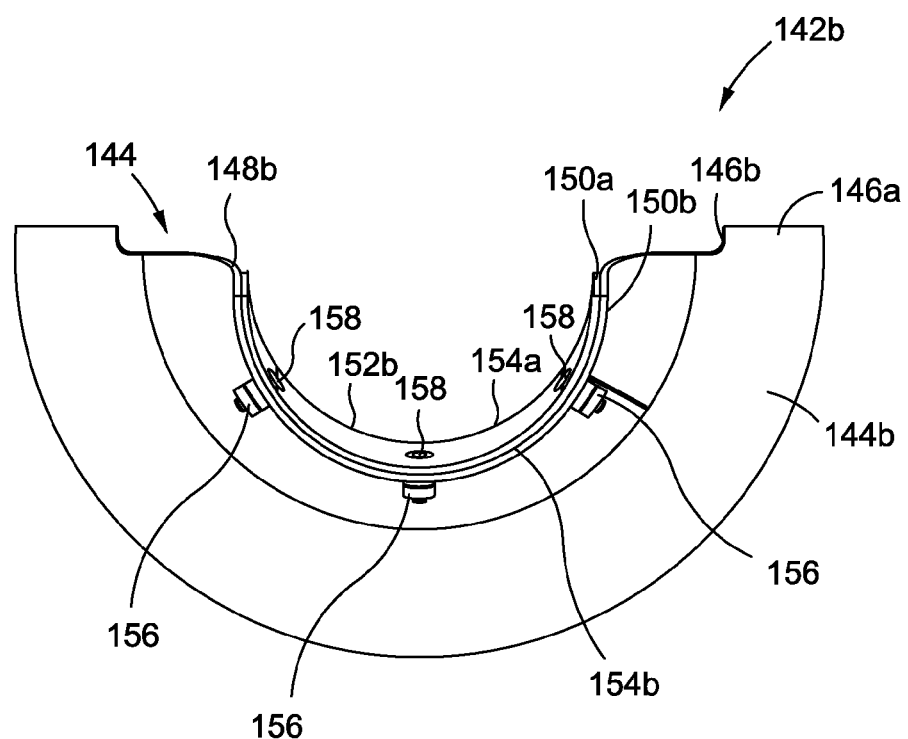
FIG. 7B is an illustration of a front perspective view of one embodiment of a lower mount pad subassembly.
Figure 7C:
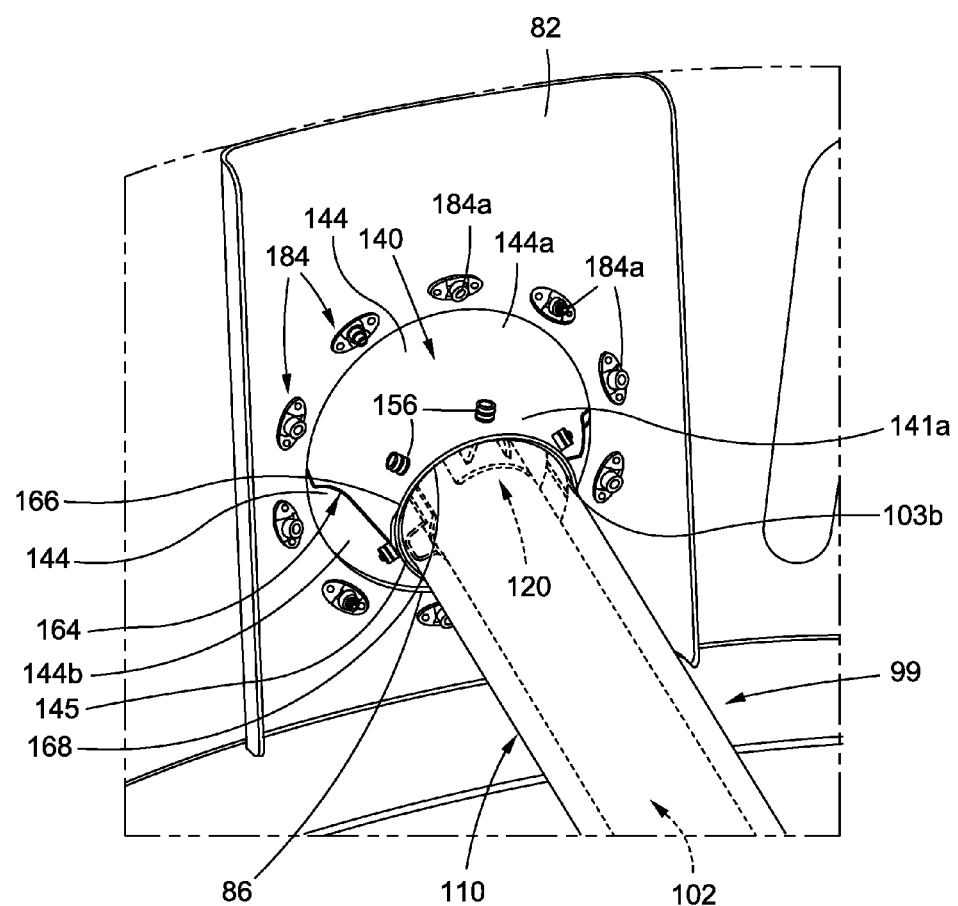
FIG. 7C is an illustration of a front perspective view of an embodiment of an assembled mount pad subassembly attached to an outer shroud duct of a slip joint subassembly.
Figure 7D:
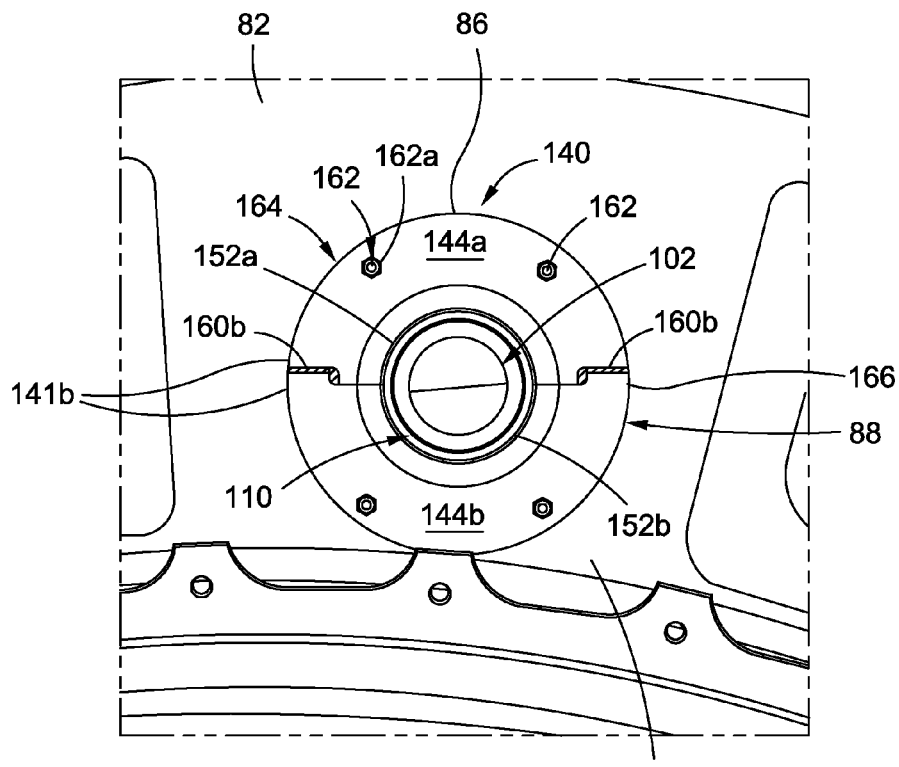
FIG. 7D is an illustration of a back view of the assembled mount pad subassembly attached to an outer shroud duct forming an aft bulkhead interface.
Figure 7E:
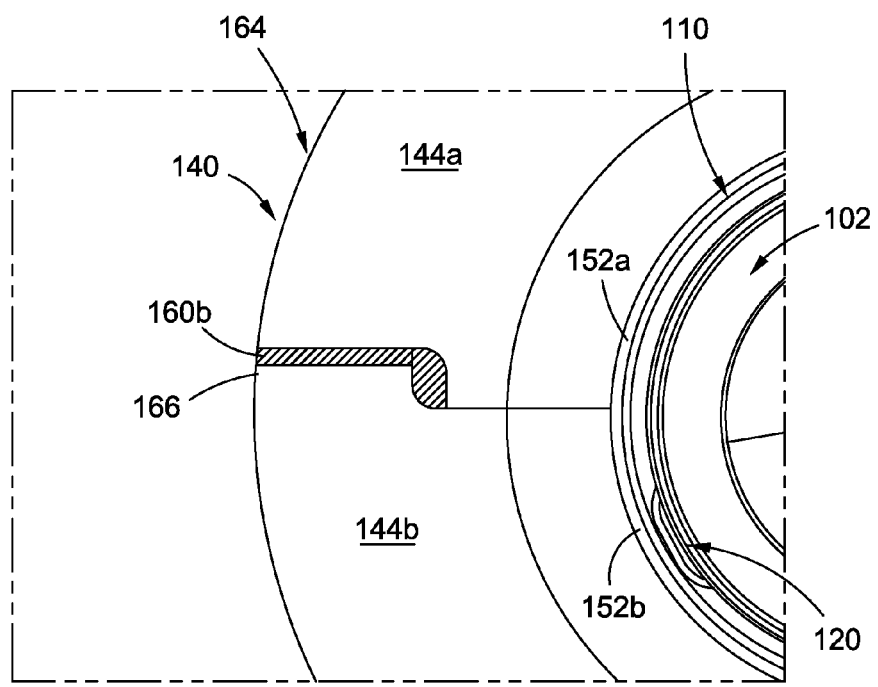
FIG. 7E is an illustration of a close-up back view of a barrier seal element coupled to the assembled mount pad subassembly.
Figure 7F:
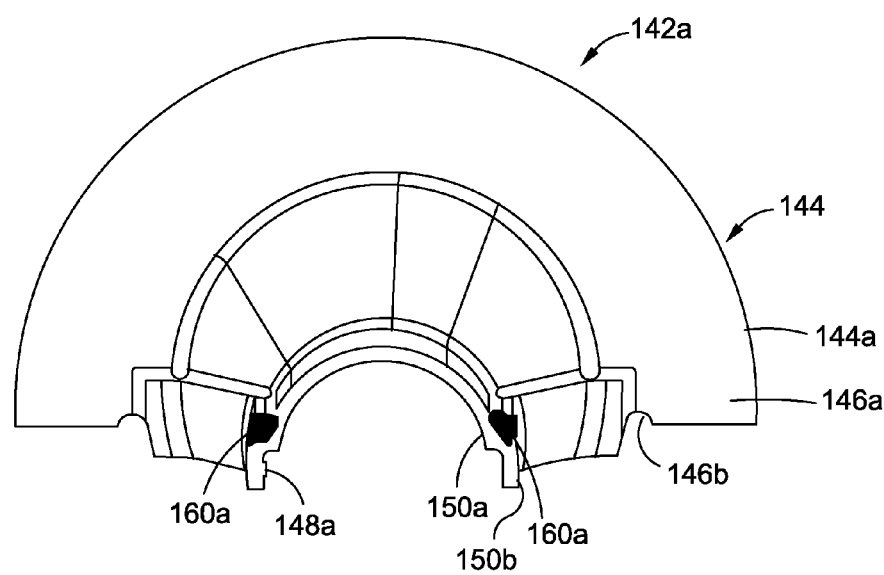
FIG. 7F is an illustration of a front perspective view of another embodiment of an upper mount pad subassembly.
Figure 7G:
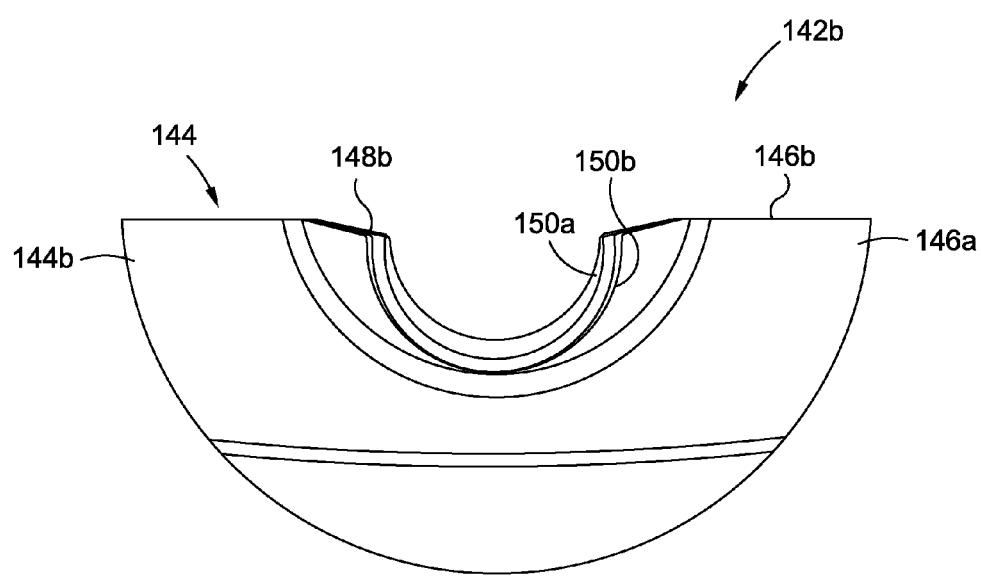
FIG. 7G is an illustration of a front perspective view of another embodiment of a lower mount pad subassembly.
Figure 7H:
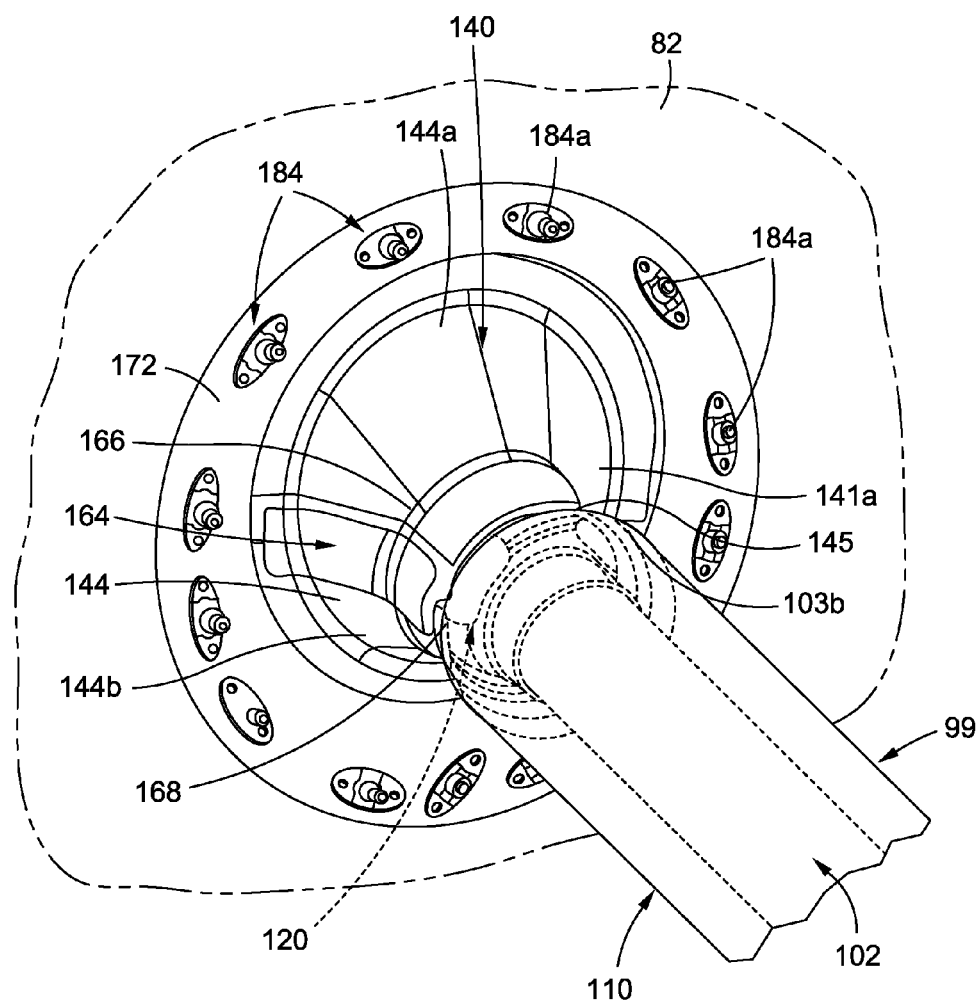
FIG. 7H is an illustration of a front perspective view of an embodiment of an assembled mount pad subassembly attached to an outer shroud duct of a slip joint subassembly.

As shown in FIGS. 6A, 6C, the EAI barrier system 100 and the aircraft EAI barrier assembly 101 further comprise a barrier subassembly 140 (see also FIGS. 7C, 7H). The barrier subassembly 140 (see FIGS. 6A, 6C, 7C, 7H) is preferably attached through the aft bulkhead 82 (see FIGS. 7C, 7H, 8A-8B). The barrier subassembly 140 serves as a barrier between an engine fan case compartment 97c (see FIG. 8B) and an aft compartment 97b (see FIG. 8B) (e.g., engine inlet compartment). The barrier subassembly 140 may also serve as a pressure barrier and/or may also serve as a fire barrier, or may also serve as another suitable barrier.

FIGS. 7A-7H show embodiments of the barrier subassembly 140 (see FIGS. 7C-7E, 7H). The barrier subassembly 140 (see FIGS. 7C-7E, 7H) preferably comprises two mount pads 144 (see FIGS. 7A-7C, 7F-7H), such as in the form of an upper mount pad 144a (see FIGS. 7A-7H) and a lower mount pad 144b (see FIGS. 7A-7H). The upper mount pad 144a (see FIGS. 7A-7H) and the lower mount pad 144b (see FIGS. 7A-7H) are preferably configured to form a joined sealed attachment 145 (see FIGS. 7C, 7H) around the aft end 103b (see FIGS. 7C, 7H) of the slip joint subassembly 99 (see FIGS. 7C, 7H) in order to form a barrier 166 (see FIGS. 7C, 7H) to an engine inlet 26 (see FIGS. 1, 8A-8B) of the engine 22 (see FIG. 1). Preferably, the upper mount pad 144a (see FIGS. 7A-7H) and the lower mount pad 144b (see FIGS. 7A-7H) are both made of a metal material such as titanium, steel, a steel alloy, or another suitable metal material. Preferably, the upper mount pad 144a (see FIGS. 7A-7H) and the lower mount pad 144b (see FIGS. 7A-7H) are both made of a metal material capable of withstanding very high temperature applications, such as preferably about 800 degrees Fahrenheit or greater; more preferably, about 1100 degrees Fahrenheit or greater; and most preferably, in a range of from about 800 degrees Fahrenheit to about 1300 degrees Fahrenheit.

The barrier subassembly 140 (see FIGS. 7C-7E, 7H) further comprises an upper mount pad subassembly 142a (see FIGS. 7A, 7F) and a lower mount pad subassembly 142b (see FIGS. 7B, 7G). FIG. 7A is an illustration of a front perspective view of one embodiment of the upper mount pad subassembly 142a. As shown in FIG. 7A, the upper mount pad subassembly 142a preferably comprises the upper mount pad 144a having a forward side 146a and an aft side 146b. As further shown in FIG. 7A, the upper mount pad 144a comprises an upper flange portion 148a having an inner side 150a and an outer side 150b.

As further shown in FIG. 7A, in this embodiment, the upper mount pad 144a optionally comprises an upper wear strip element 152a having an inner side 154a and an outer side 154b. Preferably, as shown in FIG. 7A, the outer side 154b of the upper wear strip element 152a is attached adjacent to the inner side 150a of the upper flange portion 148a via countersink attachment elements 156 inserted through openings 158.

Preferably, the inner side 154a (see FIG. 7A) of the upper wear strip element 152a (see FIG. 7A) is adjacent the outer surface 116b (see FIG. 3A) of the outer shroud duct 110 (see FIGS. 3A, 7C) when the barrier subassembly 140 (see FIG. 7C) is in the joined sealed attachment 145 (see FIG. 7C) around the aft end 103b (see FIG. 7C) of the outer shroud duct 110 (see FIG. 7C). The upper wear strip element 152a (see FIG. 7A) is preferably made of a material that is durable and has desired wear properties, such as steel, a steel alloy, or another suitably durable and wear resistant material. In addition, the upper wear strip element 152a (see FIG. 7A) is preferably made of a material capable of withstanding very high temperature applications, such as preferably about 800 degrees Fahrenheit or greater; more preferably, about 1100 degrees Fahrenheit or greater; and most preferably, in a range of from about 800 degrees Fahrenheit to about 1300 degrees Fahrenheit.

FIG. 7B is an illustration of a front perspective view of one embodiment of a lower mount pad subassembly 142b. As shown in FIG. 7B, the lower mount pad subassembly 142b preferably comprises a lower mount pad 144b having a forward side 146a and an aft side 146b. As further shown in FIG. 7B, the lower mount pad 144b comprises a lower flange portion 148b having an inner side 150a and an outer side 150b.

As further shown in FIG. 7B, in this embodiment, the lower mount pad 144b optionally comprises a lower wear strip element 152b having an inner side 154a and an outer side 154b. Preferably, as shown in FIG. 7B, the outer side 154b of the lower wear strip element 152b is attached adjacent to the inner side 150a of the lower flange portion 148b via countersink attachment elements 156 inserted through openings 158.

Preferably, the inner side 154a (see FIG. 7B) of the lower wear strip element 152b (see FIG. 7B) is adjacent the outer surface 116b (see FIG. 3A) of the outer shroud duct 110 (see FIGS. 3A, 3C) when the barrier subassembly 140 (see FIG. 7C) is in the joined sealed attachment 145 (see FIG. 7C) around the aft end 103b (see FIG. 7C) of the outer shroud duct 110 (see FIG. 7C). The lower wear strip element 152b (see FIG. 7A) is preferably made of a material that is durable and has desired wear properties, such as steel, a steel alloy, or another suitably durable and wear resistant material. In addition, the lower wear strip element 152b (see FIG. 7A) is preferably made of a material capable of withstanding very high temperature applications, such as preferably about 800 degrees Fahrenheit or greater; more preferably, about 1100 degrees Fahrenheit or greater; and most preferably, in a range of from about 800 degrees Fahrenheit to about 1300 degrees Fahrenheit.

FIG. 7C is an illustration of a front perspective view of an embodiment of an assembled mount pad subassembly 164 attached to an outer shroud duct 110 of a slip joint subassembly 99. The upper mount pad subassembly 142a (see FIG. 7A) is preferably coupled to the lower mount pad subassembly 142b (see FIG. 7B) to form an embodiment of the assembled mount pad subassembly 164 (see FIG. 7C). The assembled mount pad subassembly 164 (see FIG. 7C) is preferably configured to transmit loads from the slip joint subassembly 99 (see FIG. 7C), and in particular, from the outer shroud duct 110 (see FIG. 7C), into the aft bulkhead 82 (see FIG. 7C).

As shown in FIG. 7C, the barrier subassembly 140 comprises a forward portion 141a configured for a joined sealed attachment 145 to a portion 168 of the aft end 103b of the outer shroud duct 110 to form the barrier 166 to the engine inlet 26 (see FIGS. 1, 8A-8B) of the engine 22 (see FIG. 1). As further shown in FIG. 7C, the forward portion 141a of the barrier subassembly 140 is preferably inserted through the aft bulkhead opening 86 of the aft bulkhead 82. FIG. 7C further shows attachment elements 184, such as in the form of bolts 184a, screws, or other suitable attachment elements, which may be used to attach a boot element retainer 172 (see FIG. 6A) against the aft side 90b (see FIG. 7D) of the aft bulkhead 82 (see FIG. 7C). FIG. 7C further shows the support element 120 positioned between the inner supply duct 102 and the outer shroud duct 110 at the aft end 103b of the slip joint subassembly 99.

FIG. 7D is an illustration of a back view of the assembled mount pad subassembly 164 attached to an outer shroud duct 110 to form the aft bulkhead interface 88 at the aft bulkhead opening 86 of the aft bulkhead 82. As shown in FIG. 7D, an aft portion 141b of the barrier subassembly 140 is attached to the aft side 90b of the aft bulkhead 82 via one or more aft bulkhead attachment elements 162, such as in the form of bolts 162a, screws, or other suitable attachment elements. The aft portion 141b (see FIG. 7D) of the barrier subassembly 140 is preferably configured for sealed attachment to the aft bulkhead 82 (see FIG. 7D) to form the aft bulkhead interface 88 (see FIG. 7D).

As further shown in FIG. 7D, the barrier subassembly 140 preferably comprises the upper mount pad 144a and the lower mount pad 144b configured to form the joined sealed attachment 145 (see FIG. 7C) around the aft end 103b (see FIG. 7C) of the outer shroud duct 110 in order to form the barrier 166 to the engine inlet 26 (see FIGS. 1, 8A-8B) of the engine 22 (see FIG. 1). As further shown in FIG. 7D, the upper wear strip element 152a and the lower wear strip element 152b are adjacent the outer shroud duct 110.

The barrier subassembly 140 (see FIGS. 7D, 7E, 7H) further comprises one or more barrier seal elements 160a (see FIGS. 7A, 7F), 160b (see FIGS. 7D, 7E) coupled to the assembled mount pad subassembly 164 (see FIGS. 7C, 7D, 7H). FIGS. 7A, 7F show barrier seal elements 160a coupled to portions of the upper flange portion 148a. FIGS. 7D, 7E show barrier seal elements 160b coupled to portions where the upper mount pad 144a and the lower mount pad 144b join together to form the barrier subassembly 140.

FIG. 7E is an illustration of a close-up back view of the barrier seal element 160b coupled to the assembled mount pad subassembly 164. As shown in FIG. 7E, the barrier seal element 160b may be coupled to a portion between where the upper mount pad 144a and the lower mount pad 144b join together to form the barrier subassembly 140. As further shown in FIG. 7E, the barrier subassembly 140 preferably comprises the upper mount pad 144a, the lower mount pad 144b, and the barrier seal element 160b, configured to form a barrier 166 to the engine inlet 26 (see FIGS. 1, 8A-8B) of the engine 22 (see FIG. 1). As further shown in FIG. 7E, the upper wear strip element 152a and the lower wear strip element 152b are adjacent the outer shroud duct 110.

FIG. 7F is an illustration of a front perspective view of another embodiment of the upper mount pad subassembly 142a. As shown in FIG. 7F, the upper mount pad subassembly 142a preferably comprises the mount pad 144, such as upper mount pad 144a, having the forward side 146a and the aft side 146b. As further shown in FIG. 7F, the upper mount pad 144a comprises the upper flange portion 148a having the inner side 150a and the outer side 150b, and the barrier seal elements 160a coupled to portions of the upper flange portion 148a. The embodiment of the upper mount pad subassembly 142a shown in FIG. 7F does not include the upper wear strip element 152a.

FIG. 7G is an illustration of a front perspective view of another embodiment of the lower mount pad subassembly 142b. As shown in FIG. 7G, the lower mount pad subassembly 142b preferably comprises the lower mount pad 144b having the forward side 146a and then aft side 146b. As further shown in FIG. 7G, the lower mount pad 144b comprises the lower flange portion 148b having the inner side 150a and the outer side 150b. The embodiment of the lower mount pad subassembly 142b shown in FIG. 7G does not include the lower wear strip element 152b.

FIG. 7H is an illustration of a front perspective view of an embodiment of the assembled mount pad subassembly 164 attached to the outer shroud duct 110 of the slip joint subassembly 99. The upper mount pad subassembly 142a (see FIG. 7F) is preferably coupled to the lower mount pad subassembly 142b (see FIG. 7G) to form the assembled mount pad subassembly 164 (see FIG. 7H). The assembled mount pad subassembly 164 (see FIG. 7H) is preferably configured to transmit loads from the slip joint subassembly 99 (see FIG. 7H), and in particular, from the outer shroud duct 110 (see FIG. 7H), into the aft bulkhead 82 (see FIG. 7H).

As shown in FIG. 7H, the barrier subassembly 140 comprises the forward portion 141a configured for a joined sealed attachment 145 to the portion 168 of the aft end 103b of the outer shroud duct 110 to form the barrier 166 to the engine inlet 26 (see FIGS. 1, 8A-8B) of the engine 22 (see FIG. 1). FIG. 7H further shows attachment elements 184, such as in the form of bolts 184a, screws, or other suitable attachment elements, which may be used to attach a boot element retainer 172 (see FIG. 6A) against the aft side 90b (see FIG. 7D) of the aft bulkhead 82 (see FIG. 7H). FIG. 7H further shows the support element 120 positioned between the inner supply duct 102 and the outer shroud duct 110 at the aft end 103b of the slip joint subassembly 99.

As shown in FIGS. 6A-6D, the aircraft EAI barrier assembly 101 may further comprise a vapor barrier subassembly 170. The vapor barrier subassembly 170 (see FIGS. 6A-6D, 9A-9B) is preferably attached to the aft bulkhead 82 (see FIGS. 9A-9B) and may be adjacent the barrier subassembly 140 (see FIGS. 9A-9B).

Figure 8A:
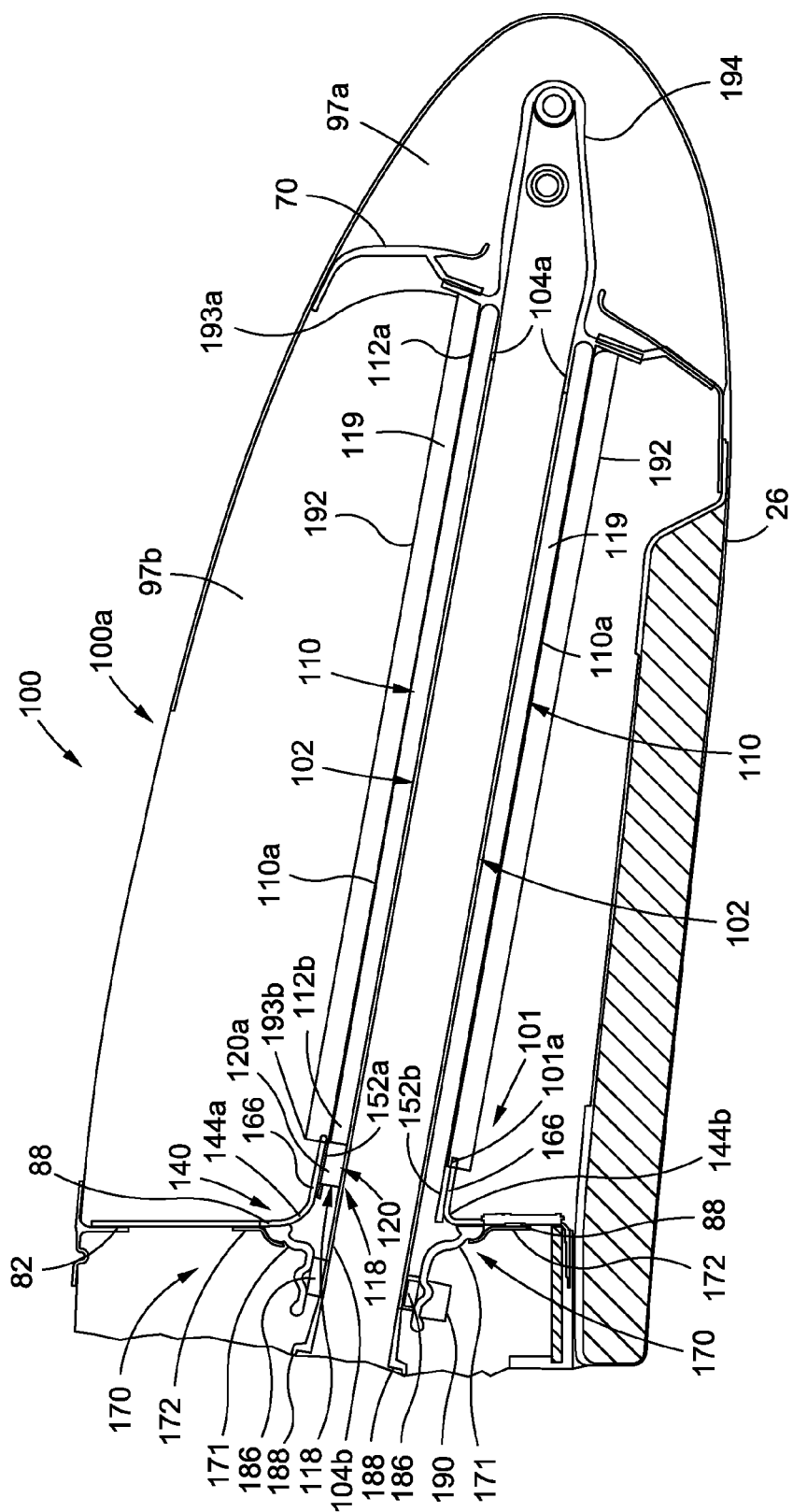
FIG. 8A is an illustration of a sectional side view of an embodiment of an aircraft EAI barrier system with one embodiment of a support element and an outer shroud duct of the disclosure.
Figure 8B:
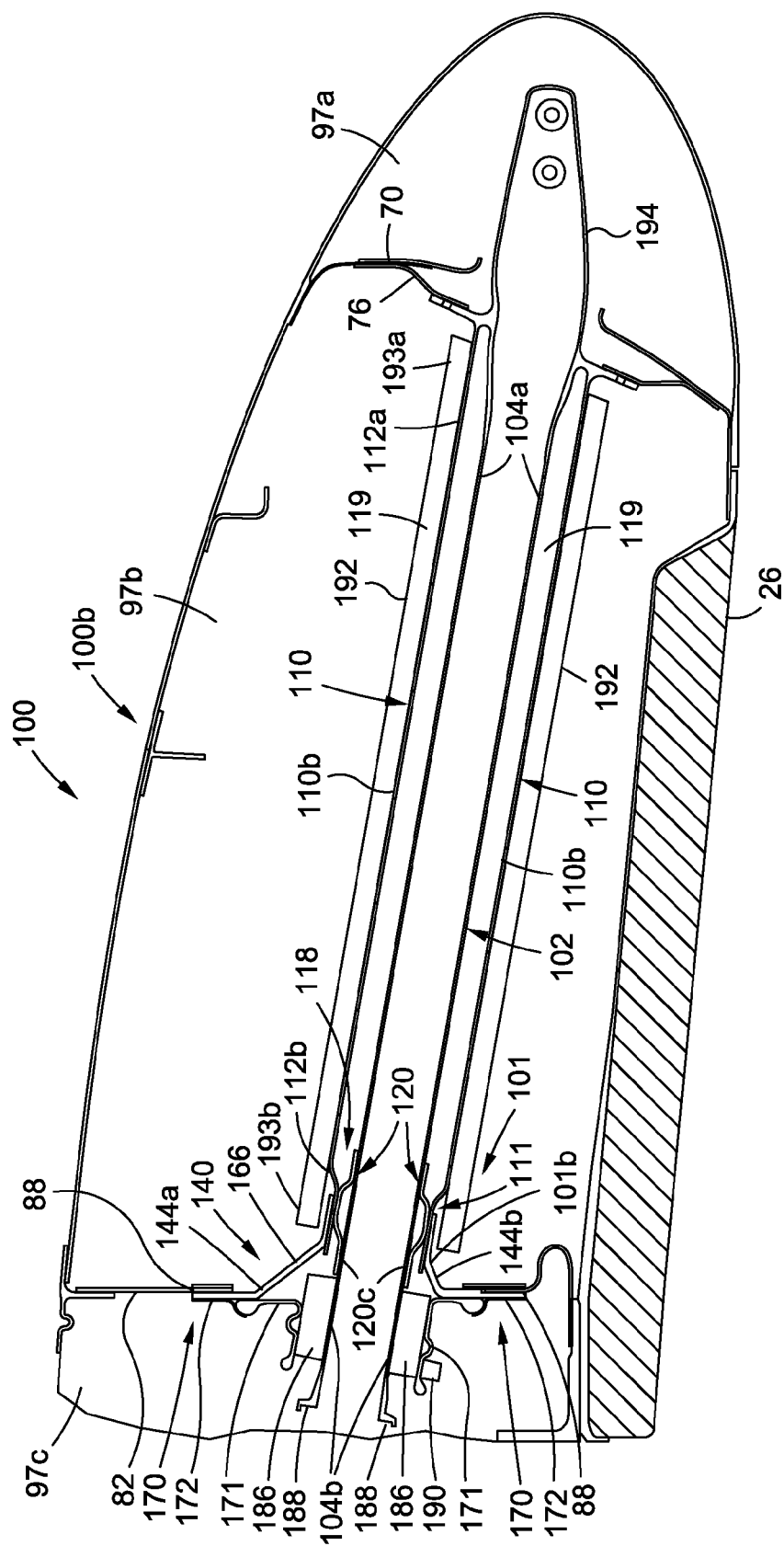
FIG. 8B is an illustration of a sectional side view of another embodiment of an aircraft EAI barrier system with another embodiment of a support element and an outer shroud duct of the disclosure.
Figure 9A:
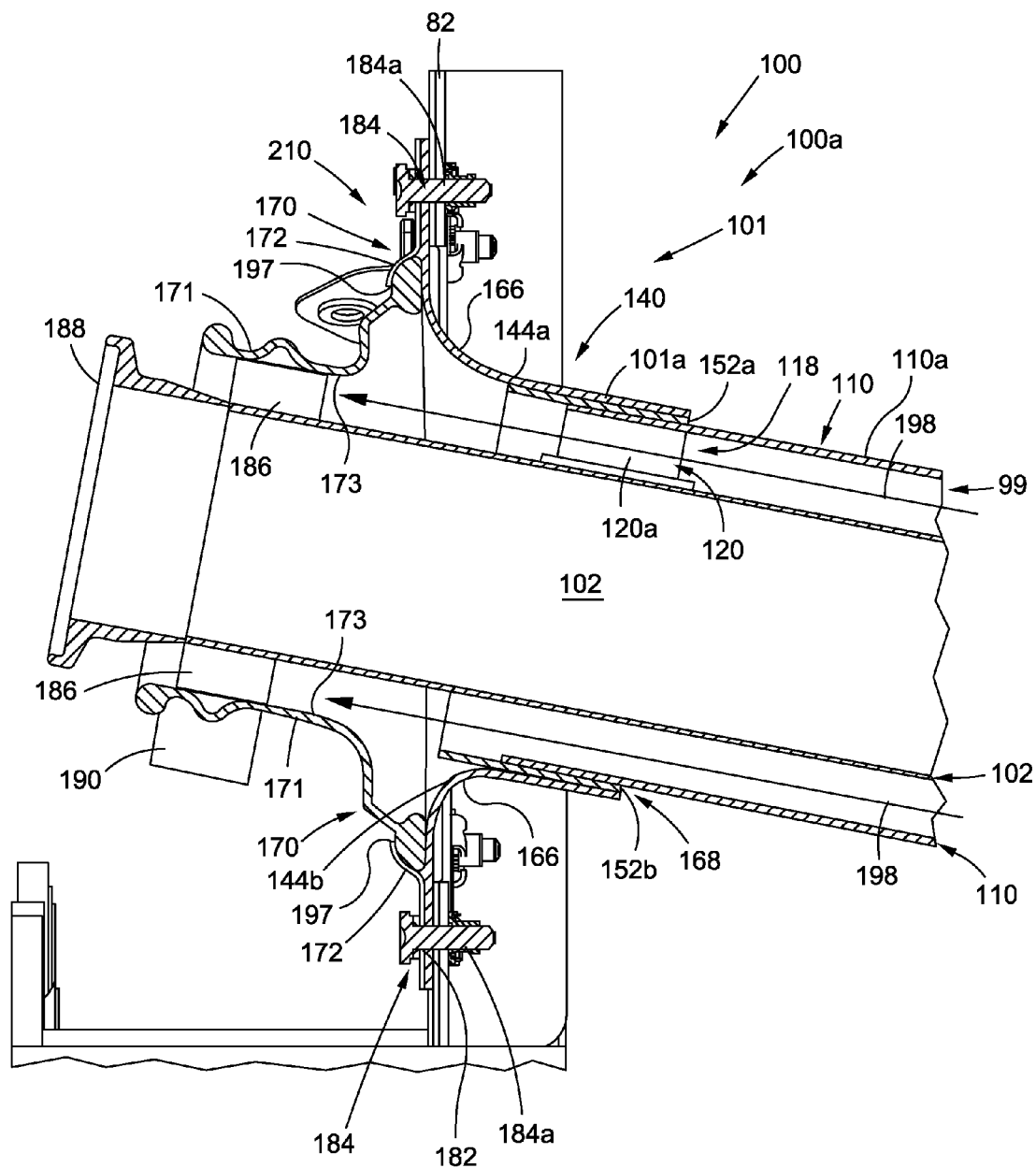
FIG. 9A is an illustration of a close-up, partial, sectional side view of an embodiment of an aircraft EAI barrier system with one embodiment of a support element and an outer shroud duct of the disclosure installed at an aft bulkhead.
Figure 9B:
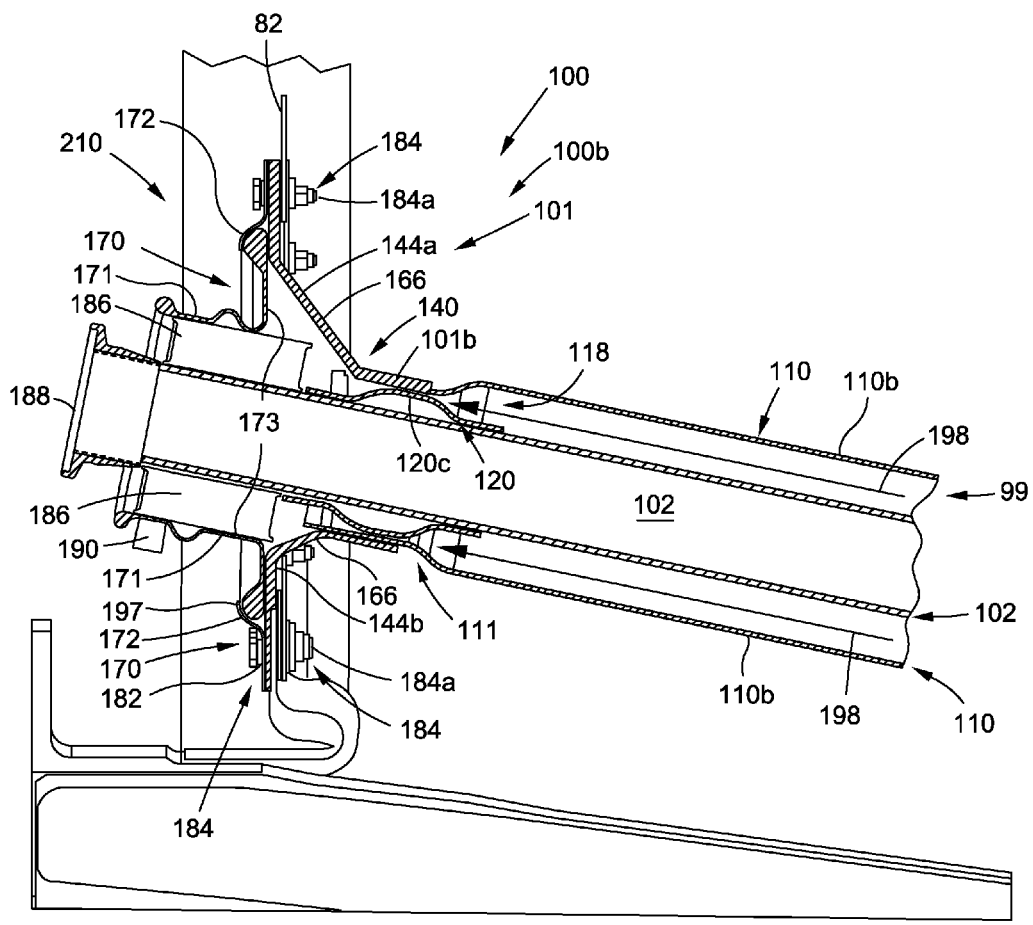
FIG. 9B is an illustration of a close-up, partial, sectional side view of another embodiment of an aircraft EAI barrier system with another embodiment of a support element and an outer shroud duct of the disclosure installed at an aft bulkhead.

As shown in FIGS. 6A-6D, the vapor barrier subassembly 170 comprises a boot element 171 and a boot element retainer 172 configured to form a vapor barrier 173 (see FIGS. 9A-9B) to the slip joint subassembly 99 (see FIGS. 9A-9B). The boot element 171 (see FIGS. 6A-6D) may serve as a vapor barrier to prevent fuel-rich air from contacting the slip joint subassembly 99 (see FIGS. 3A, 3C). In addition, the boot element 171 (see FIGS. 6A-6D) may serve to prevent leaked or sprayed flammable fluid from entering the shrouded volume 119 (see FIGS. 8A-8B), that is, the cavity or area between the inner supply duct 102 (see FIGS. 8A-8B) and the outer shroud duct 110 (see FIGS. 8A-8B). Moreover, the boot element 171 (see FIGS. 6A-6D) may serve as a burst duct detection indicator 197 (see FIGS. 9A-9B), discussed in detail below. The vapor barrier subassembly 170 may be optional if the ventilation flow rate is sufficient, e.g., greater than three (3) air exchanges per minute, or if the engine fan case compartment 97c (see FIG. 8B) is not a fire zone.

The boot element 171 (see FIGS. 6A-6D) is preferably held in place by the boot element retainer 172 (see FIGS. 6A-6D). The boot element retainer 172 (see FIGS. 6A-6D, 9A-9B) is preferably attached to the aft side 90b (see FIG. 5B) of the aft bulkhead 82 (see FIGS. 5B, 9A-9B). The boot element 171 is preferably made of a silicone and woven ceramic fabric material that can withstand very high temperature applications, such as preferably about 800 degrees Fahrenheit or greater; more preferably, about 1100 degrees Fahrenheit or greater; and most preferably, in a range of from about 800 degrees Fahrenheit to about 1300 degrees Fahrenheit, and that has particularly strong sealing capability. However, the boot element 171 may also be made of another suitable material that can withstand very high temperature applications and that provides strong sealing capability.

As shown in FIGS. 6A, 6C, the boot element retainer 172 preferably has a ring configuration 176, a central opening 178 configured to receive and retain in place the boot element 171, and a rim portion 180. As shown in FIGS. 6B, 6D, the rim portion 180 preferably has a forward side 174a and an aft side 174b, and preferably has a plurality of openings 182 configured to receive attachment elements 184, such as in the form of bolts 184a, screws, or other suitable attachment elements.

The vapor barrier subassembly 170 (see FIGS. 6A-6D) may also act as a burst duct detection indicator 197 (see FIGS. 9A-9B). When the boot element 171 (see FIGS. 6A-6D) is disengaged from the boot element retainer 172 (see FIGS. 6A-6D) during a burst duct occurrence, the disengagement of the boot element 171 (see FIGS. 6A-6D) serves as an indicator of the burst duct occurrence. As shown in FIGS. 9A-9B, if a hole or leak occurs in the inner supply duct 102, burst duct pressure indicated by arrows 198, flows out of the inner supply duct 102 and through the outer shroud duct 110 from the forward bulkhead 70 (see FIGS. 8A-8B) toward the aft bulkhead 82 (see FIGS. 9A-9B). The boot element 171 (see FIGS. 6A-6D, 9A-9B) preferably disengages from the boot element retainer 172 (see FIGS. 6A-6D, 9A-9B) during a burst duct occurrence to provide pressure relief to the engine fan and compressor unit 24 (see FIG. 1) of the engine 22 (see FIG. 1).

Preferably, the slip joint subassembly 99 (see FIGS. 6A, 6C), the barrier subassembly 101 (see FIGS. 6A-6D), and the vapor barrier subassembly 170 (see FIGS. 6A-6D) together comprise the aircraft engine anti-icing (EAI) barrier assembly 100 (see FIGS. 6A-6D) configured to accommodate for thermal expansion of the slip joint subassembly 99 (see FIGS. 6A, 6C) via the sliding joint 118 (see FIGS. 8A-8B, 9A-9B), at elevated temperatures of greater than about 800 degrees Fahrenheit, and preferably at very high temperature applications, such as about 800 degrees Fahrenheit or greater; more preferably, such as about 1100 degrees Fahrenheit or greater; and most preferably, such as in a range of from about 800 degrees Fahrenheit to about 1300 degrees Fahrenheit In another embodiment of the disclosure, there is provided the aircraft engine anti-icing (EAI) barrier system 100 (see FIGS. 6A-6D, 8A-8B, 9A-9B). FIG. 8A is an illustration of a sectional side view of an embodiment of the aircraft EAI barrier system 100, such as in the form of aircraft EAI barrier system 100a, in an engine inlet 26. FIG. 8A shows the aircraft EAI barrier system 100a with one embodiment of the support element 120, such as in the form of support element 120a, and one embodiment of the outer shroud duct 110, such as in the form of outer shroud duct 110a. FIG. 8A further shows one embodiment of the barrier subassembly 140 having the upper wear strip element 152a and the lower wear strip element 152b. FIG. 8A shows the aircraft EAI barrier system 100a installed aft of a forward compartment 97a and installed in an aft compartment 97b between the forward bulkhead 70 and the aft bulkhead 82 in the engine inlet 26. As further shown in FIG. 8A, the nozzle assembly 194 extends into the forward compartment 97a, and the aft end 104b of the inner supply duct 102 may extend past the aft bulkhead interface 88 at the aft bulkhead 82.

FIG. 8B is an illustration of a sectional side view of another embodiment of the aircraft EAI barrier system 100, such as in the form of aircraft EAI barrier system 100b, in the engine inlet 26. FIG. 8B shows the aircraft EAI barrier system 100b with another embodiment of the support element 120, such as in the form of support element 120c, and another embodiment of the outer shroud duct 110, such as in the form of outer shroud duct 110b. FIG. 8B further shows another embodiment of the barrier subassembly 140 without the upper wear strip element 152a and without the lower wear strip element 152b. FIG. 8B shows the aircraft EAI barrier system 100b installed aft of the forward compartment 97a and installed in the aft compartment 97b between the forward bulkhead 70 and the aft bulkhead 82 in the engine inlet 26. As further shown in FIG. 8B, the nozzle assembly 194 extends into the forward compartment 97a, and the aft end 104b of the inner supply duct 102 may extend past the aft bulkhead interface 88 at the aft bulkhead 82.

FIG. 9A is an illustration of a close-up, partial, sectional side view of an embodiment of the aircraft EAI barrier system 100, such as in the form of aircraft EAI barrier system 100a, installed at the aft bulkhead 82. FIG. 9A shows the aircraft EAI barrier system 100a with an embodiment of the support element 120, such as in the form of support element 120a, and an embodiment of the outer shroud duct 110, such as in the form of outer shroud duct 110a. FIG. 9A further shows an embodiment of the barrier subassembly 140 having the upper wear strip element 152a and the lower wear strip element 152b.

FIG. 9B is an illustration of a close-up, partial, sectional side view of another embodiment of an aircraft EAI barrier system 100, such as in the form of aircraft EAI barrier system 100b, installed at the aft bulkhead 82. FIG. 9B shows the aircraft EAI barrier system 100b with another embodiment of the support element 120, such as in the form of support element 120c, and another embodiment of the outer shroud duct 110, such as in the form of outer shroud duct 110b. FIG. 9A further shows another embodiment of the barrier subassembly 140 without the upper wear strip element 152a and without the lower wear strip element 152b.

As discussed above, the aircraft EAI barrier system 100 (see FIGS. 6A-6D, 8A-8B, 9A-9B) comprises the aircraft engine anti-icing (EAI) barrier assembly 101 (see FIGS. 6A-6D, 8A-8B, 9A-9B). The aircraft EAI barrier assembly 101 (see FIGS. 6A-6D) comprises the slip joint subassembly 99 (see FIGS. 3A-3C, 6A, 6C). As discussed in detail above, the slip joint subassembly 99 (see FIGS. 3A-3C, 6A, 6C) comprises the inner supply duct 102 (see FIGS. 3A-3C, 6A, 6C) slidably engaged within the outer shroud duct 110 (see FIGS. 3A-3C, 6A, 6C). As shown in FIGS. 3A, 3C, 6A, 6C, the inner supply duct 102 has the forward end 104a and the outer shroud duct 110 has the forward end 112a. Both forward ends 104a, 112a, respectively, are preferably configured for fixed attachment to the nozzle assembly 194 (FIGS. 3A, 3C, 6A, 6C, 8A-8B) at the forward bulkhead 70 (see FIGS. 8A-8B) of the engine 22 (see FIG. 1) of the aircraft 10a (see FIG. 1).

As shown in FIGS. 3A, 3C, 6A, 6C, and as discussed above, the forward ends 104a, 112a, respectively, of each of the inner supply duct 102 and the outer shroud duct 110 are preferably attached, such as via welding, directly to the nozzle assembly 194 and are preferably attached through the forward bulkhead opening 72 (see FIG. 5A) of the forward bulkhead 70 (see FIG. 5A). This may result, as discussed above, in eliminating use at the forward bulkhead 70 (see FIG. 5A) of leak prevention sealing elements made of materials unable to withstand elevated temperatures of greater than about 800 degrees Fahrenheit.

As shown in FIGS. 3A, 3C, 6A-6D, 8A-8B, the slip joint subassembly 99 may further comprise the coupling element 188 attached to the aft end 104b of the inner supply duct 102. The coupling element 188 (see FIGS. 3A, 3C, 6A-6D, 8A-8B) is preferably configured for attachment to a duct extension 94 (see FIG. 5B). The coupling element 188 is preferably made of a metal material such as nickel alloy, steel, steel alloy, or another suitable metal material capable of withstanding very high temperature applications, such as preferably about 800 degrees Fahrenheit or greater; more preferably, about 1100 degrees Fahrenheit or greater; and most preferably, in a range of from about 800 degrees Fahrenheit to about 1300 degrees Fahrenheit.

As shown in FIGS. 8A-8B, when the aircraft EAI barrier system 100 is installed, the inner supply duct 102 has the aft end 104b located at the aft bulkhead 82 of the engine 22 (see FIG. 1), and the outer shroud duct 110 has the aft end 112b located at the aft bulkhead 82 of the engine 22 (see FIG. 1). As shown in FIGS. 8A-8B, the aft ends 104b, 112b, respectively, form the sliding joint 118 via one or more support elements 120 disposed between the aft ends 104b, 112b.

As discussed in detail above, the one or more support elements 120 (see FIGS. 8A-8B, 9A-9B) may each comprise a two-piece bumper support element 120a (see FIGS. 3A, 8A, 9A) comprising a bumper portion 122 (see FIG. 3B) and a doubler portion 124 (see FIG. 3B); may each comprise a one-piece ring bumper support element 120b (see FIGS. 4A-4D); or may each comprise an elongated ring bumper support element 120c (see FIGS. 4F, 8B, 9B). The one or more support elements 120 (see FIGS. 8A-8B) preferably transmit load from the inner supply duct 102 (see FIG. 8A) to the outer shroud duct 110 (see FIG. 8A).

As shown in FIGS. 8A-8B, 9A-9B, and as discussed in detail above, the aircraft EAI barrier assembly 101 of the aircraft EAI barrier system 100 may further comprise a barrier subassembly 140 attached through the aft bulkhead 82. The barrier subassembly 140 (see FIGS. 8A-8B, 9A-9B) preferably comprises two mount pads 144 (see FIG. 7C, 7H), such as in the form of upper mount pad 144a (see FIGS. 8A-8B, 9A-9B) and lower mount pad 144b (see FIGS. 8A-8B, 9A-9B) configured for a joined sealed attachment 145 (see FIGS. 7C, 7H) around the aft end 112b (see FIGS. 8A-8B) of the outer shroud duct 110 (see FIGS. 8A-8B). This forms a barrier 166 (see FIGS. 8A-8B) to the engine inlet 26 (see FIGS. 8A-8B) of the engine 22 (see FIG. 1).

The barrier subassembly 140 (see FIGS. 8A-8B, 9A-9B) further comprises the upper mount pad subassembly 142a (see FIGS. 7A, 7F) comprising the upper mount pad 144a (see FIGS. 7A, 7F) with the optional attached upper wear strip element 152a (see FIG. 7A). The barrier subassembly 140 (see FIGS. 8A-8B, 9A-9B) further comprises the lower mount pad subassembly 142b (see FIGS. 7B, 7G) comprising the lower mount pad 144b (see FIGS. 7B, 7G) with the optional attached lower wear strip element 152b (see FIG. 7B). The lower mount pad subassembly 142b (see FIGS. 7B, 7G) is preferably coupled to the upper mount pad subassembly 142a (see FIGS. 7A, 7F) form the assembled mount pad subassembly 164 (see FIGS. 7C, 7H).

The barrier subassembly 140 (see FIGS. 8A-8B, 9A-9B) preferably further comprises one or more barrier seal elements 160a (see FIGS. 7A, 7F) and/or one or more barrier seal elements 160b (see FIG. 7D) coupled to the assembled mount pad subassembly 164 (see FIGS. 7C, 7D). The assembled mount pad subassembly 164 (see FIGS. 7C, 7D) is preferably configured to transmit loads from the outer shroud duct 110 (see FIGS. 7C, 7H) into the aft bulkhead 82 (see FIGS. 7C, 7H).

As shown in FIGS. 8A-8B, 9A-9B, and as discussed in detail above, the aircraft EAI barrier assembly 101 of the aircraft EAI barrier system 100 may further comprise a vapor barrier subassembly 170 attached to the aft bulkhead 82 and adjacent the barrier subassembly 140. As shown in FIGS. 8A-8B, 9A-9B, the vapor barrier subassembly 170 comprises the boot element 171 and the boot element retainer 172 configured to form the vapor barrier 173 to the slip joint subassembly 99. As shown in FIGS. 9A-9B, the aircraft EAI barrier assembly 101 is preferably configured to accommodate for thermal expansion of the slip joint subassembly 99, and in particular, is preferably configured to accommodate for thermal expansion of the inner supply duct 102 of the slip joint subassembly 99, via the sliding joint 118 at elevated temperatures of greater than about 800 degrees Fahrenheit, and preferably, at very high temperature applications such as about 800 degrees Fahrenheit or greater; more preferably, such as about 1100 degrees Fahrenheit or greater; and most preferably, such as in a range of from about 800 degrees Fahrenheit to about 1300 degrees Fahrenheit.

The vapor barrier subassembly 170 (see FIGS. 9A-9B) may preferably act as a burst duct detection indicator 197 (see FIGS. 9A-9B), as discussed above. When the boot element 171 (see FIGS. 9A-9B) is disengaged from the boot element retainer 172 (see FIGS. 9A-9B) during a burst duct occurrence, the disengagement of the boot element 171 (see FIGS. 9A-9B) serves as an indicator of the burst duct occurrence.

The aircraft EAI barrier assembly 101 is shown in FIGS. 9A-9B in an installed position 210. The aircraft EAI barrier assembly 101 (see FIGS. 9A-9B) is preferably incorporated into the aircraft EAI barrier system 100 (see FIGS. 9A-9B).

As shown in FIGS. 6A-6D, 8A-8B, the aircraft EAI barrier system 100 further comprises a forward insulating component 192 that is preferably wrapped around the outer surface 116b (see FIGS. 3A, 3C) of the outer shroud duct 110. As shown in FIGS. 6A-6D, 8A-8B, the forward insulating component 192 has a forward end 193a and an aft end 193b. As shown in FIGS. 6B, 6D, the forward insulating component 192 further has an inner side 195a and an outer side 195b.

As shown in FIGS. 6A-6D, 8A-8B, 9A-9B, the aircraft EAI barrier system 100 further comprises an aft insulating component 186 that is preferably wrapped around or coupled to the aft end 104b (see FIGS. 8A-8B) of the inner supply duct 102 between the boot element 171 and the aft end 104b (see FIGS. 8A-8B) of the inner supply duct 102. The forward insulating component 192 (see FIGS. 8A-8B) and the aft insulating component 186 (see FIGS. 8A-8B) are preferably made of an insulation material, such as a metal foil and ceramic fiberglass material sewn into a batting material, or another suitable insulation material, and may be in the form of thermal blankets or another suitable form. The thicknesses of the forward insulating component 192 (see FIGS. 8A-8B) and the aft insulating component 186 (see FIGS. 8A-8B) may be about ¼ (one quarter) inch to about ⅜ (three-eighths) inch thick or greater. Preferably, the forward insulating component 192 (see FIGS. 8A-8B) and the aft insulating component 186 (see FIGS. 8A-8B) are able to withstand high temperature applications, such as preferably about 800 degrees Fahrenheit or greater; more preferably, about 1100 degrees Fahrenheit or greater; and most preferably, in a range of from about 800 degrees Fahrenheit to about 1300 degrees Fahrenheit.

As shown in FIGS. 6A-6D, 8A-8B, 9A-9B, the aircraft EAI barrier system 100 further comprises a clamp element 190 attached to the aft insulating component 186 and the boot element 171. The clamp element 190 (6A-6D, 8A-8B, 9A-9B) is preferably made of a metal material such as steel, a steel alloy, or another suitable metal material that is able to withstand very high temperature applications, such as preferably about 800 degrees Fahrenheit or greater; more preferably, about 1100 degrees Fahrenheit or greater; and most preferably, in a range of from about 800 degrees Fahrenheit to about 1300 degrees Fahrenheit. The clamp element 190 (6A-6D, 8A-8B, 9A-9B) may be in the form of a ring clamp with torque fastener that may be slid over a portion of the boot element 171 (see FIGS. 6A-6D). Alternatively, the clamp element 190 may be in another suitable form.

Figure 10A:
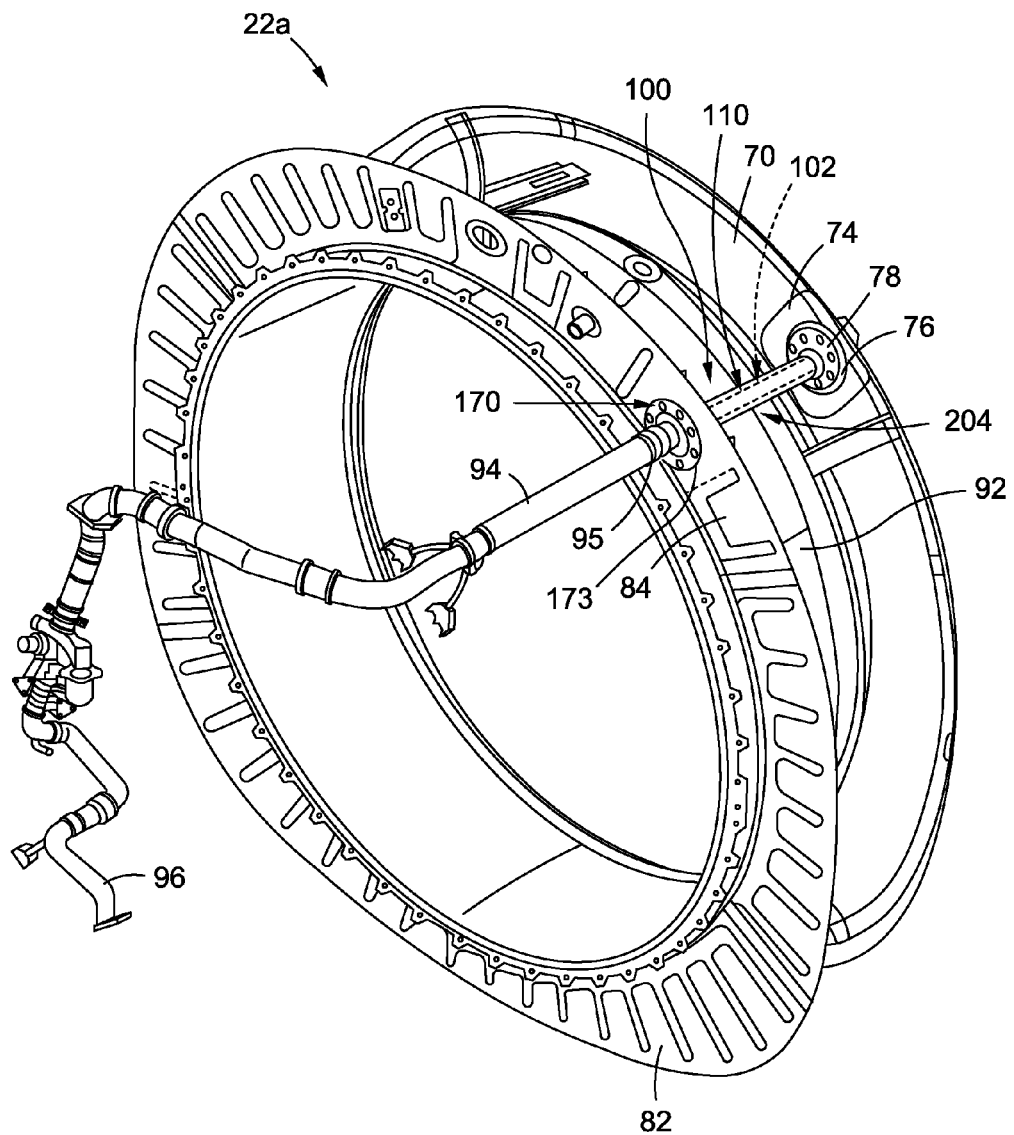
FIG. 10A is an illustration of a perspective view of an embodiment of an aircraft EAI barrier system of the disclosure in an installed position between an aft bulkhead and a forward bulkhead of an engine of an aircraft.

FIG. 10A is an illustration of a perspective view of an embodiment of the aircraft EAI barrier system 100 of the disclosure in an installed position 204 in an engine 22a of an aircraft 10a. As shown in FIG. 10A, the aircraft EAI barrier system 100 is installed between the aft bulkhead 82 and the forward bulkhead 70 across the inner barrel portion 92. As shown in FIG. 10A, the vapor barrier subassembly 170 is attached to the aft bulkhead web 84 of the aft bulkhead 82 and forms a vapor barrier 173 at the aft bulkhead 82. As further shown in FIG. 10A, the duct extension 94 extends from the aft duct extension interface 95 and extends to an engine attachment duct 96. As further shown in FIG. 10A, the inner supply duct 102 and the outer shroud duct 110 are preferably fixed at the forward bulkhead interface 76 formed on the forward mount pad portion 74. The nozzle flange 78 (see FIG. 3A) is positioned between the forward bulkhead interface 76 and the inner supply duct 102 and outer shroud duct 110.

Figure 10B:
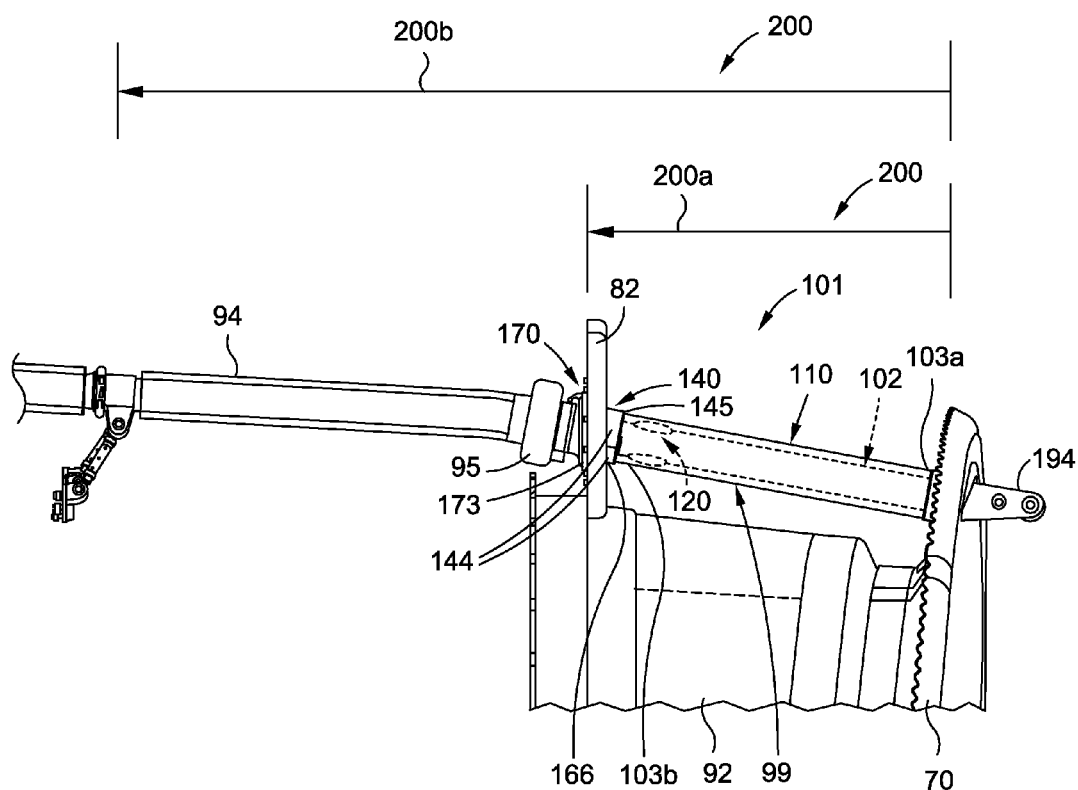
FIG. 10B is an illustration of a side perspective view of an embodiment of an aircraft EAI barrier assembly of the disclosure showing thermal expansion lengths of an inner supply duct and an outer shroud duct of the aircraft EAI barrier assembly; and, FIG. 11 is a flow diagram of a method of the disclosure.

FIG. 10B is an illustration of a side perspective view of an embodiment of the aircraft EAI barrier assembly 101 of the disclosure showing thermal expansion lengths 200 of the inner supply duct 102 and the outer shroud duct 110. As shown in FIG. 10B, with the aircraft EAI barrier assembly 101 and the aircraft EAI barrier system 100 (see FIGS. 8A-8B) disclosed herein, the outer shroud duct 110 may thermally expand at an outer shroud duct thermal expansion length 200a. For example, for an outer shroud duct 110 having a length of 17 inches, the outer shroud duct thermal expansion length 200a may be 0.14 inch. As shown in FIG. 10B, the inner supply duct 102 may thermally expand at an inner supply duct thermal expansion length 200b. For example, for an inner supply duct 102 having a length of 50 inches, the inner supply duct thermal expansion length 200b may be 0.4 inch. The sliding joint 118 (see FIGS. 8A-8B, 9A-9B) configuration formed by the inner supply duct 102 (see FIG. 10B) and the outer shroud duct 110 (see FIG. 10B) of the aircraft EAI barrier assembly 101 (see FIG. 10B) accommodates for thermal expansion of the inner supply duct 102 and the outer shroud duct 110.

Figure 11:
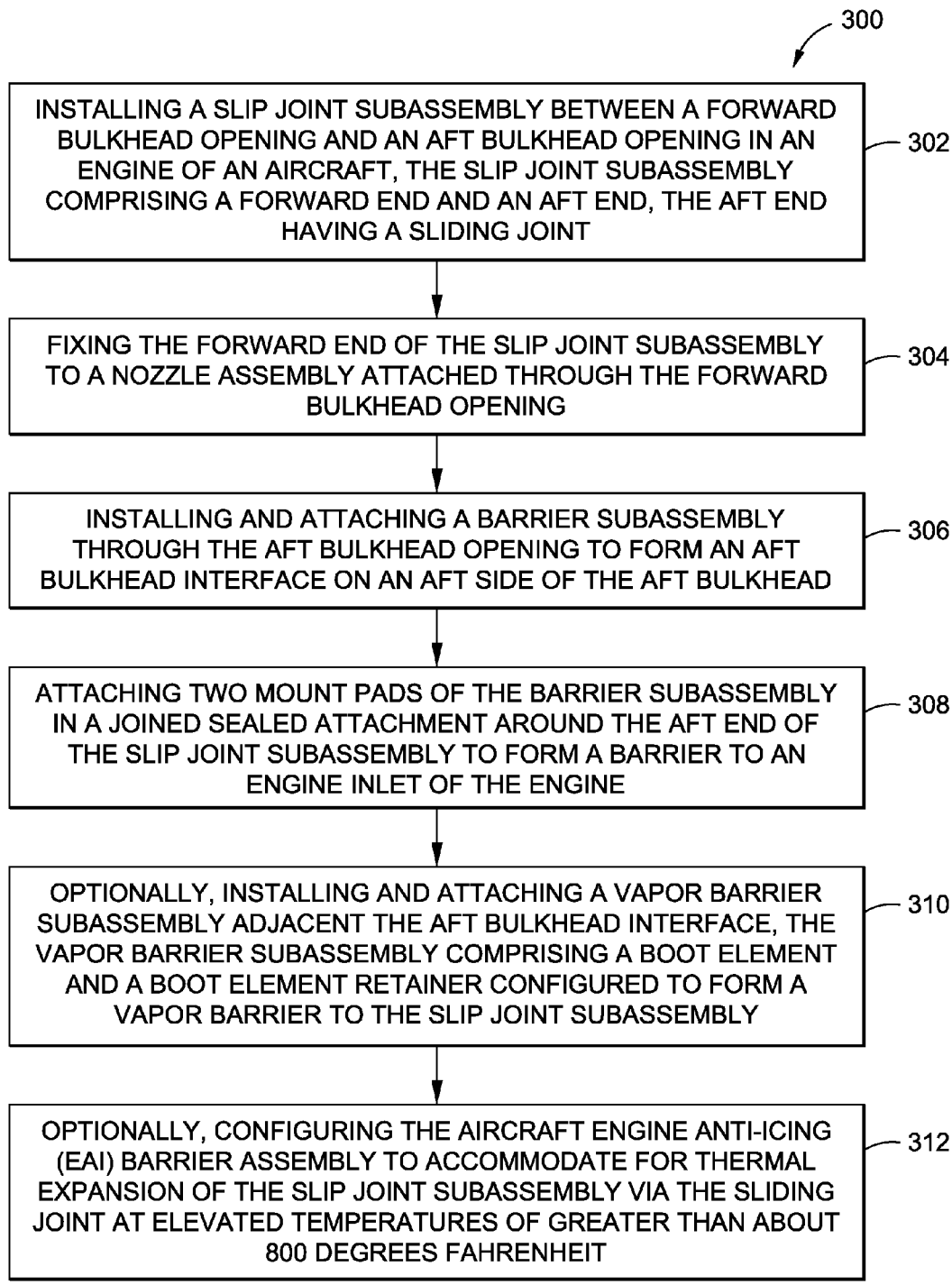

In another embodiment of the disclosure, there is provided a method 300 of installing an aircraft engine anti-icing (EAI) barrier assembly 101 (see FIGS. 7A6A-6D, 8A-8B, 9A-9B) in an aircraft 10a (see FIG. 1). FIG. 11 is a flow diagram of a method 300 of the disclosure.

As shown in FIG. 11, the method 300 comprises step 302 of installing in an aircraft 7A (see FIG. 1) a slip joint subassembly 99 (see FIGS. 3A, 3C) between a forward bulkhead opening 72 (see FIG. 5A) and an aft bulkhead opening 86 (see FIG. 5A) in an engine 22 (see FIG. 1), for example, engine 22a (see FIG. 5A) of an aircraft 10a (see FIG. 1). The slip joint subassembly 99 (see FIGS. 3A, 3C) comprises a forward end 103a (see FIGS. 3A, 3C) and an aft end 103b (see FIGS. 3A, 3C). The aft end 103b (see FIGS. 3A, 3C) has a sliding joint 118 (see FIG. 3A).

The step 302 of installing the slip joint subassembly 99 (see FIGS. 3A, 3C) preferably comprises installing a slip joint subassembly 99 (see FIGS. 3A, 3C) comprising an inner supply duct 102 (see FIGS. 3A, 3C) slidably engaged within an outer shroud duct 110 (see FIGS. 3A, 3C). The step 302 of installing the slip joint subassembly 99 (see FIGS. 3A, 3C) further comprises accommodating for thermal expansion of the inner supply duct 102 (see FIGS. 3A, 3C) in a direction aft of the aft end 112b (see FIGS. 3A, 3C) of the outer shroud duct 110 (see FIGS. 3A, 3C) by using the sliding joint 118 (see FIG. 3A) formed by the aft end 104b (see FIGS. 3A, 3C) of the inner supply duct 102 (see FIGS. 3A, 3C) and the aft end 112b (see FIGS. 3A, 3C) of the outer shroud duct 110 (see FIGS. 3A, 3C).

The step 302 of installing the slip joint subassembly 99 (see FIGS. 3A, 3C) preferably comprises installing one or more support elements 120 (see FIGS. 3A-3C, 4A-4F) attached to an outer surface 108b (see FIG. 3B) of the inner supply duct 102 (see FIG. 3B). As shown in FIG. 3A, the one or more support elements 120 are preferably configured for sliding engagement with an inner surface 116a of the outer shroud duct 110. The step 302 of installing the slip joint subassembly 99 (see FIGS. 3A, 3C) further comprises transmitting load from the inner supply duct 102 (see FIGS. 3A, 3C) to the outer shroud duct 110 (see FIGS. 3A, 3C) via the one or more support elements 120 (see FIGS. 3A-3C, 4A-4F).

As shown in FIG. 11, the method 300 further comprises step 304 of fixing or attaching the forward end 103a (see FIGS. 3A, 3C) of the slip joint subassembly 99 (see FIGS. 3A, 3C) to a nozzle assembly 194 (see FIGS. 3A, 3C) attached through the forward bulkhead opening 72 (see FIG. 5A).

As shown in FIG. 11, the method 300 further comprises step 306 of installing and attaching a barrier subassembly 140 (see FIGS. 6A-6D, 8A-8B, 9A-9B) through the aft bulkhead opening 86 (see FIGS. 5A, 7C, 7D) to form an aft bulkhead interface 88 (see FIG. 7D) on an aft side 90b (see FIGS. 5B, 7D) of the aft bulkhead 82 (see FIGS. 5B, 7D).

As shown in FIG. 11, the method 300 further comprises step 308 of attaching two mount pads 144 (see FIGS. 7B, 7C, 7F) of the barrier subassembly 140 (see FIGS. 6A-6D, 8A-8B, 9A-9B) in a joined sealed attachment 145 (see FIGS. 7C, 7H) around the aft end 103b (see FIGS. 7C, 7H) of the slip joint subassembly 99 (see FIGS. 3A, 3C) to support the slip joint subassembly 99 (see FIGS. 3A, 3C) and to form a barrier 166 (see FIGS. 7C, 7D, 7E, 8A-8B) to an engine inlet 26 (see FIGS. 1, 8A-8B) of the engine 22 (see FIG. 1) of the aircraft 10a (see FIG. 1).

As shown in FIG. 11, the method 300 further comprises step 310 of optionally installing and attaching a vapor barrier subassembly 170 (see FIG. 6A-6D, 8A-8B, 9A-9B) adjacent to the aft bulkhead interface 88 (see FIGS. 8A-8B). The vapor barrier subassembly 170 (see FIG. 6A-6D, 8A-8B, 9A-9B) comprises a boot element 171 (see FIGS. 6A-6D, 8A-8B, 9A-9B) and a boot element retainer 172 (see FIG. 6A-6D, 8A-8B, 9A-9B) configured to form a vapor barrier 173 (see FIGS. 8A-8B, 9A-9B) to the slip joint subassembly 99 (see FIGS. 9A-9B).

As shown in FIG. 11, the method 300 further comprises step 312 of optionally, configuring the aircraft engine anti-icing (EAI) barrier assembly 101 (see FIGS. 6A-6D) to accommodate for thermal expansion lengths 200 (see FIG. 10B) of the slip joint subassembly 99 (see FIGS. 3A, 3C) via the sliding joint 118 (see FIGS. 3A, 3C) at the aft end 103b (see FIGS. 3A, 3C) at elevated temperatures of greater than about 800 degrees Fahrenheit. Preferably, the aircraft EAI barrier assembly 101 (see FIGS. 6A-6D) accommodates for thermal expansion lengths 200 (see FIG. 10B) of the slip joint subassembly 99 (see FIGS. 3A, 3C) via the sliding joint 118 (see FIGS. 3A, 3C) at very high temperature applications, such as preferably about 800 degrees Fahrenheit or greater; more preferably, about 1100 degrees Fahrenheit or greater; and most preferably, in a range of from about 800 degrees Fahrenheit to about 1300 degrees Fahrenheit.

The method 300 preferably comprises using the aircraft EAI barrier assembly 101 (see FIGS. 8A-8B) in an aircraft EAI barrier system 100 (see FIGS. 8A-8B) in the engine 22 (see FIG. 1) of the aircraft 10a (see FIG. 1) to provide anti-icing protection to the engine inlet 26 (see FIGS. 1, 8A-8B) of the engine 22 (see FIG. 1), such as engine 22a (see FIGS. 5A-5B).

The method 300 may further comprise wrapping a forward insulating component 192 (see FIGS. 6A-6D, 8A-8B) around an outer surface 116b (see FIGS. 3A, 3C) of the outer shroud duct 10 (see FIGS. 3A, 3C) of the slip joint subassembly 99 (see FIGS. 3A, 3C). Preferably, the forward insulating component 192 (see FIGS. 6A-6D) is wrapped around the outer surface 116b (see FIGS. 3A, 3C) of the outer shroud duct 110 (see FIGS. 3A, 3C) of the slip joint subassembly 99 (see FIGS. 3A, 3C).

The method 300 may further comprise coupling an aft insulating component 186 (see FIGS. 6A-6D, 8A-8B) between the boot element 171 (see FIGS. 6A-6D, 8A-8B) and the aft end 103b (see FIGS. 3A, 3C) of the slip joint subassembly 99 (see FIGS. 3A, 3C). Preferably, the aft insulating component 186 (see FIGS. 6A-6D, 8A-8B) is wrapped around the aft end 104b (see FIGS. 8A-8B) of the inner supply duct 102 (see FIGS. 8A-8B) of the slip joint subassembly 99 (see FIGS. 3A. 3C), so that the aft insulating component 186 (see FIGS. 8A-8B) is positioned between the boot element 171 (see FIGS. 8A-8B) and the aft end 104b (see FIGS. 8A-8B) of the inner supply duct 102 (see FIGS. 8A-8B).

The method 300 may further comprise attaching a clamp element 190 (see FIGS. 6A-6D, 8A-8B, 9A-9B) coupled to the aft insulating component 186 (see FIGS. 6A-6D, 8A-8B, 9A-9B) and the boot element 171 (see FIGS. 6A-6D, 8A-8B, 9A-9B) to hold the aft insulating component 186 against the boot element 171. The clamp element 190 (see FIGS. 6A-6D, 8A-8B, 9A-9B) may comprise a ring clamp with torque fastener or another suitable clamp element. Preferably, the aft insulating component 186 (see FIGS. 6A-6D, 8A-8B, 9A-9B) is preferably installed first, then the boot element 171 (see FIGS. 6A-6D, 8A-8B, 9A-9B) and the boot element retainer 172 (see FIGS. 6A-6D, 8A-8B, 9A-9B), then the clamp element 190 (see FIGS. 6A-6D, 8A-8B, 9A-9B), and then the forward insulating component 192 (see FIGS. 6A-6D, 8A-8B, 9A-9B).

The method 300 may further comprising detecting a burst duct occurrence with the boot element 171 (see FIGS. 9A-9B) of the vapor barrier subassembly 170 (see FIGS. 9A-9B). During a burst duct occurrence where a hole or opening is formed in the inner supply duct 102 (see FIGS. 9A-9B), the boot element 171 (see FIGS. 9A-9B) may become disengaged from the boot element retainer 172 (see FIGS. 9A-9B) due to burst duct pressure indicated by arrows 198 (see FIGS. 9A-9B). The disengagement of the boot element 171 (see FIGS. 9A-9B) from the boot element retainer 172 (see FIGS. 9A-9B) may serve as an indicator of the burst duct occurrence.

Disclosed embodiments of the aircraft engine anti-icing (EAI) barrier assembly 101 (see FIGS. 6A-6D), the aircraft engine anti-icing (EAI) barrier system 100 (see FIGS. 6A-6D, 8A-8B, 9A-9B), and the method 300 (see FIG. 11) provide numerous advantages as compared to existing EAI assemblies, systems and methods. Disclosed embodiments of the aircraft EAI barrier assembly 101 (see FIGS. 6A-6D), the aircraft EAI barrier system 100 (see FIGS. 6A-6D, 8A-8B, 9A-9B), and the method 300 (see FIG. 11) provide for anti-icing protection of the engine inlet 26 (see FIGS. 1, 8A-8B) of the engine 22 (see FIG. 1) by accommodating thermal expansion of the inner supply duct 102 (see FIGS. 3A, 3C) and by accommodating some thermal expansion of the outer shroud duct 110 (see FIGS. 3A, 3C), at very high temperature applications, such as preferably about 800 degrees Fahrenheit or greater; more preferably, about 1100 degrees Fahrenheit or greater; and most preferably, in a range of from about 800 degrees Fahrenheit to about 1300 degrees Fahrenheit.

In addition, disclosed embodiments of the aircraft EAI barrier assembly 101 (see FIGS. 6A-6D), the aircraft EAI barrier system 100 (see FIGS. 6A-6D, 8A-8B, 9A-9B), and the method 300 (see FIG. 11) provide for the inner supply duct 102 (see FIGS. 3A, 3C) and the outer shroud duct 110 (see FIGS. 3A, 3C) preferably being welded directly to the nozzle assembly 194 (see FIGS. 3A, 3C) at their forward ends 104a, 112a, respectively. This preferably results in the elimination of the need for or use at the forward bulkhead 70 (see FIGS. 5A-5B) of leak prevention sealing elements made of materials unable to withstand elevated temperatures of greater than about 800 degrees Fahrenheit, for example, silicone/metallic seals for high temperature applications, and in particular, at very high temperature applications such as preferably about 800 degrees Fahrenheit or greater; more preferably, about 1100 degrees Fahrenheit or greater; and most preferably, in a range of from about 800 degrees Fahrenheit to about 1300 degrees Fahrenheit. In addition, this preferably results in the elimination of the need for or use at the forward bulkhead 70 (see FIGS. 5A-5B) of carbon seals which may be very costly.

Moreover, disclosed embodiments of the aircraft EAI barrier assembly 101 (see FIGS. 6A-6D), the aircraft EAI barrier system 100 (see FIGS. 6A-6D, 8A-8B, 9A-9B), and the method 300 (see FIG. 11) provide for support of the inner supply duct 102 (see FIG. 3A, 3C) by the outer shroud duct 110 (see FIGS. 3A, 3C) via one or more support elements 120 (see FIGS. 3A-3C, 4A-4F), and further provide for support of the outer shroud duct 110 (see FIGS. 3A, 3C) via the aft bulkhead 82 (see FIG. 5B) through the upper mount pad subassembly 142a (see FIGS. 7A, 7F) and the lower mount pad subassembly 142b (see FIGS. 7A, 7F), including the two mount pads 144 (see FIGS. 7C, 7H) of the barrier subassembly 140 (see FIGS. 7C, 7H). Such support features preferably eliminate and/or minimize the need for link devices or linking mechanisms to support the inner supply duct 102 (see FIGS. 3A, 3C) and/or the outer shroud duct 110 (see FIGS. 3A, 3C). This, in turn, may reduce the overall weight of the aircraft EAI barrier assembly 101 (see FIGS. 6A-6D) and the aircraft EAI barrier system 100 (see FIGS. 6A-6D, 8A-8B, 9A-9B). Such decreased weight may, in turn, decrease aircraft fuel consumption.

Further, disclosed embodiments of the aircraft EAI barrier assembly 101 (see FIGS. 6A-6D), the aircraft EAI barrier system 100 (see FIGS. 6A, 8, 9), and the method 300 (see FIG. 11) provide a barrier subassembly 140 (see FIG. 7C) that forms a barrier 166 (see FIG. 7C) at the aft bulkhead 82 (see FIG. 7C). The barrier 166 (see FIG. 7C) is created by the upper mount pad subassembly 142a (see FIG. 7C) and the lower mount pad subassembly 142b (see FIG. 7C), including the two mount pads 144 (see FIG. 7C), that form a joined sealed attachment 145 (see FIG. 7C) at the aft end 112b (see FIG. 6A) of the outer shroud duct 110 (see FIG. 7C). The barrier 166 (see FIG. 7C) is maintained while still providing for a sliding joint 118 (see FIG. 9A).

In addition, disclosed embodiments of the aircraft EAI barrier assembly 101 (see FIGS. 3B, 3A), the aircraft EAI barrier system 100 (see FIGS. 6A-6D, 8A-8B, 9A-9B), and the method 300 (see FIG. 11) provide a vapor barrier subassembly 170 (see FIGS. 9A-9B) that forms a vapor barrier 173 (see FIGS. 9A-9B) with a boot element 171 (see FIGS. 9A-9B) held in place with a boot element retainer 172 (see FIGS. 9A-9B). The vapor barrier subassembly 170 (see FIGS. 9A-9B) is capable of withstanding the thermal expansion of the inner supply duct 102 (see FIGS. 9A-9B). Further, the vapor barrier subassembly 170 (see FIGS. 9A-9B) allows for burst duct detection via the boot element 171 (see FIGS. 9A-9B). When the boot element 171 (see FIGS. 9A-9B) is disengaged from the boot element retainer 172 (see FIGS. 9A-9B) during a burst duct occurrence, such disengagement of the boot element 171 (see FIGS. 9A-(B) serves as a burst duct detection indicator 197 (see FIGS. 9A-9B) that indicates a burst duct has occurred.

Finally, disclosed embodiments of the aircraft EAI barrier assembly 101 (see FIGS. 6A-6D), the aircraft EAI barrier system 100 (see FIGS. 6A-6D, 8A-8B, 9A-9B), and the method 300 (see FIG. 11) provide for a less complex and simpler design, as compared to existing EAI assemblies, systems and methods, and further provide for a design that is able to withstand higher temperature requirements, e.g., greater than about 800 degrees Fahrenheit, and in particular, at very high temperature applications such as preferably about 800 degrees Fahrenheit or greater; more preferably, about 1100 degrees Fahrenheit or greater; and most preferably, in a range of from about 800 degrees Fahrenheit to about 1300 degrees Fahrenheit.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. An aircraft engine anti-icing (EAI) barrier assembly comprising:
   a slip joint subassembly having a forward end and an aft end, the forward end configured for fixed attachment at a forward bulkhead of an engine of an aircraft, and the aft end having a sliding joint;
   a barrier subassembly attached to an aft side of an aft bulkhead and inserted through an aft bulkhead opening of the aft bulkhead, the barrier subassembly comprising two mount pads comprised of an upper mount pad coupled to a lower mount pad to form an assembled mount pad subassembly and configured for joined sealed attachment around the aft end of the slip joint subassembly to form a barrier between an engine fan case compartment and an aft compartment in an engine inlet of the engine; and
   a vapor barrier subassembly attached to the aft side of the aft bulkhead and adjacent the barrier subassembly, the vapor barrier subassembly comprising a boot element coupled to a boot element retainer, and being configured to form a vapor barrier to the slip joint subassembly.

2. The assembly of claim 1 wherein the vapor barrier subassembly acts as a burst duct detection indicator, and when the boot element is disengaged from the boot element retainer during a burst duct occurrence, the boot element disengagement indicates the burst duct occurrence.

3. The assembly of claim 1 wherein the assembly is configured to accommodate for thermal expansion of the slip joint subassembly via the sliding joint at elevated temperatures of greater than about 800 degrees Fahrenheit.

4. The assembly of claim 1 wherein the slip joint subassembly comprises an inner supply duct slidably engaged within an outer shroud duct, the inner supply duct and the outer shroud duct each having an aft end forming the sliding joint configured to accommodate for thermal expansion of the inner supply duct aft of the aft end of the outer shroud duct.

5. The assembly of claim 4 wherein the sliding joint comprises one or more support elements attached to an outer surface of the inner supply duct, the one or more support elements configured for sliding engagement with an inner surface of the outer shroud duct, and wherein the one or more support elements transmit load from the inner supply duct to the outer shroud duct.

6. The assembly of claim 4 wherein the inner supply duct and the outer shroud duct each have a forward end attached directly to a nozzle assembly attached through a forward bulkhead opening of the forward bulkhead.

7. The assembly of claim 6 wherein the inner supply duct and the outer shroud duct being attached at the forward bulkhead eliminates use at the forward bulkhead of leak prevention sealing elements made of materials unable to withstand elevated temperatures of greater than about 800 degrees Fahrenheit.

8. The assembly of claim 1 wherein the barrier subassembly further comprises
one or more barrier seal elements coupled to the assembled mount pad subassembly,
wherein the assembled mount pad subassembly is configured to transmit loads from the slip joint subassembly into the aft bulkhead.

9. An aircraft engine anti-icing (EAI) barrier system comprising:
an aircraft engine anti-icing (EAI) barrier assembly comprising:
a slip joint subassembly comprising an inner supply duct slidably engaged within an outer shroud duct, the inner supply duct and the outer shroud duct each having a forward end configured for fixed attachment at a forward bulkhead of an engine of an aircraft, and the inner supply duct and the outer shroud duct each having an aft end at an aft bulkhead of the engine, the aft ends forming a sliding joint via one or more support elements disposed between the aft ends;
a barrier subassembly attached to an aft side of the aft bulkhead and inserted through the aft bulkhead, the barrier subassembly comprising two mount pads comprised of an upper mount pad coupled to a lower mount pad to form an assembled mount pad subassembly and configured for joined sealed attachment around the aft end of the outer shroud duct to form a barrier between an engine fan case compartment and an aft compartment in an engine inlet of the engine; and
a vapor barrier subassembly attached to the aft side of the aft bulkhead and adjacent the barrier subassembly, the vapor barrier subassembly comprising a boot element coupled to a boot element retainer, and being configured to form a vapor barrier to the slip joint subassembly; and
a forward insulating component wrapped around the outer shroud duct;
an aft insulating component wrapped around the aft end of the inner supply duct; and
a clamp element attached to the aft insulating component.

10. The system of claim 9 wherein the vapor barrier subassembly acts as a burst duct detection indicator, and when the boot element is disengaged from the boot element retainer during a burst duct occurrence, the boot element disengagement indicates the burst duct occurrence.

11. The system of claim 9 wherein the aircraft EAI barrier assembly is configured to accommodate for thermal expansion of the slip joint subassembly via the sliding joint at elevated temperatures of greater than about 800 degrees Fahrenheit.

12. The system of claim 9 wherein the forward end of each of the inner supply duct and the outer shroud duct are attached directly to a nozzle assembly attached through a forward bulkhead opening of the forward bulkhead, which results in eliminating use at the forward bulkhead of leak prevention sealing elements made of materials unable to withstand elevated temperatures of greater than about 800 degrees Fahrenheit.

13. The system of claim 9 wherein the barrier subassembly further comprises
one or more barrier seal elements coupled to the assembled mount pad subassembly,
wherein the assembled mount pad subassembly is configured to transmit loads from the outer shroud duct into the aft bulkhead.

14. A method of installing an aircraft engine anti-icing (EAI) barrier assembly in an engine of an aircraft, the method comprising:
installing a slip joint subassembly between a forward bulkhead opening and an aft bulkhead opening in the engine of the aircraft, the slip joint subassembly comprising a forward end and an aft end, the aft end having a sliding joint;
fixing the forward end of the slip joint subassembly to a nozzle assembly attached through the forward bulkhead opening;
installing and attaching a barrier subassembly to an aft side of an aft bulkhead and through the aft bulkhead opening of the aft bulkhead to form an aft bulkhead interface on the aft side of the aft bulkhead;
attaching two mount pads of the barrier subassembly in a joined sealed attachment around the aft end of the slip joint subassembly to form a barrier between an engine fan case compartment and an aft compartment in an engine inlet of the engine, the two mount pads comprised of an upper mount pad coupled to a lower mount pad to form an assembled mount pad subassembly, and the assembled mount pad subassembly configured to transmit loads from the slip joint subassembly into the aft bulkhead; and
installing and attaching a vapor barrier subassembly to the aft side of the aft bulkhead and adjacent the barrier subassembly, the vapor barrier subassembly comprising a boot element coupled to a boot element retainer, and being configured to form a vapor barrier to the slip joint subassembly.

15. The method of claim 14 wherein the installing and attaching the vapor barrier subassembly to the aft side of the aft bulkhead and adjacent the barrier subassembly comprises using the vapor barrier subassembly as a burst duct detection indicator.

16. The method of claim 15 further comprising detecting a burst duct occurrence with the boot element of the vapor barrier subassembly, wherein when the boot element is disengaged from the boot element retainer during the burst duct occurrence, the boot element disengagement indicates the burst duct occurrence.

17. The method of claim 14 further comprising configuring the aircraft engine anti-icing (EAI) barrier assembly to accommodate for thermal expansion of the slip joint subassembly via the sliding joint at elevated temperatures of greater than about 800 degrees Fahrenheit.

18. The method of claim 14 wherein installing the slip joint subassembly comprises installing one or more support elements attached to an outer surface of an inner supply duct, the one or more support elements configured for sliding engagement with an inner surface of an outer shroud duct, and transmitting load from the inner supply duct to the outer shroud duct via the one or more support elements.

19. The method of claim 14 further comprising using the aircraft engine anti-icing (EAI) barrier assembly in an aircraft engine anti-icing (EAI) barrier system in the engine of the aircraft to provide anti-icing protection to the engine inlet of the engine.

20. The method of claim 14 further comprising wrapping a forward insulating component around an outer surface of the slip joint subassembly, coupling an aft insulating component to the aft end of the slip joint subassembly, and attaching a clamp element to the aft insulating component.

* * * * *